US012603420B2

(12) United States Patent
Yuan et al.

(10) Patent No.: US 12,603,420 B2
(45) Date of Patent: Apr. 14, 2026

(54) FULL-DUPLEX COMMUNICATION METHODS AND APPARATUS

(71) Applicant: ZTE Corporation, Shenzhen (CN)

(72) Inventors: Zhifeng Yuan, Shenzhen (CN); Weimin Li, Shenzhen (CN); Yuzhou Hu, Shenzhen (CN); Guanghui Yu, Shenzhen (CN); Yihua Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 366 days.

(21) Appl. No.: 17/443,744

(22) Filed: Jul. 27, 2021

(65) Prior Publication Data

US 2022/0037775 A1 Feb. 3, 2022

Related U.S. Application Data

(63) Continuation of application No. PCT/CN2019/074638, filed on Feb. 2, 2019.

(51) Int. Cl.
*H01Q 1/32* (2006.01)
*H04L 5/00* (2006.01)
(Continued)

(52) U.S. Cl.
CPC ........... *H01Q 1/325* (2013.01); *H04L 5/0048* (2013.01); *H04W 4/46* (2018.02); *H04L 5/14* (2013.01)

(58) Field of Classification Search
CPC ....... H01Q 1/325; H04W 4/46; H04L 5/0048; H04L 5/14
See application file for complete search history.

(56) References Cited

U.S. PATENT DOCUMENTS 5,668,880 A * 9/1997 Alajajian ............ H04W 12/037
370/335
10,199,746 B2 2/2019 Kim
(Continued)

FOREIGN PATENT DOCUMENTS

CN 104980522 A 10/2015
CN 105592421 A 5/2016
(Continued)

OTHER PUBLICATIONS

Extended European Search Report for application No. EP 19849745.5 dated May 12, 2022, 14p.
(Continued)

*Primary Examiner* — Sharmin Chowdhury
(74) *Attorney, Agent, or Firm* — Crowell & Moring LLP

(57) ABSTRACT

Techniques are described for a full duplex communication method and apparatus for inter-vehicle communication (V2V). A communication apparatus includes one or more transmit antennas, one or more receive antennas, and a processor. For cases where a single transmit antenna and multiple receive antennas are used, a distance between the transmit and receive antennas is greater than a pre-determined value. Further, the transmit antenna is located on or in a central region of a top surface of the vehicle and the receive antennas are evenly distributed located on the vehicle. The processor configured to generate one or more messages to be transmitted via the transmit antenna, where the one or more messages includes vehicle condition information, operational information about a driver of the vehicle, or information associated with one or more sensors of the vehicle.

19 Claims, 14 Drawing Sheets

(51) Int. Cl.
  *H04W 4/46*    (2018.01)
  *H04L 5/14*     (2006.01)

(56)       References Cited

U.S. PATENT DOCUMENTS

| | | | |
|---|---|---|---|
| 2010/0234071 A1 | 9/2010 | Shabtay et al. | |
| 2011/0012798 A1* | 1/2011 | Triolo | H01Q 1/3233 |
| | | | 343/904 |
| 2012/0115430 A1* | 5/2012 | Hawkes | H04W 4/90 |
| | | | 455/404.1 |
| 2012/0155335 A1* | 6/2012 | Khojastepour | H01Q 3/2605 |
| | | | 370/278 |
| 2015/0311985 A1* | 10/2015 | Kim | H04B 7/026 |
| | | | 455/501 |
| 2015/0380807 A1 | 12/2015 | Owen et al. | |
| 2016/0211963 A1* | 7/2016 | Liu | H01Q 1/525 |
| 2017/0264014 A1* | 9/2017 | Le-Ngoc | H01Q 21/065 |
| 2018/0003794 A1* | 1/2018 | Raghupathy | G01S 5/0226 |
| 2019/0081767 A1* | 3/2019 | Luo | H04B 1/525 |
| 2019/0138018 A1* | 5/2019 | Cave | B60W 50/023 |
| 2019/0260485 A1* | 8/2019 | Byun | H04W 4/40 |
| 2019/0289561 A1* | 9/2019 | Corley | H04W 24/02 |
| 2019/0375358 A1 | 12/2019 | Lee et al. | |
| 2020/0280827 A1* | 9/2020 | Fechtel | H04W 8/08 |

FOREIGN PATENT DOCUMENTS

| | | |
|---|---|---|
| CN | 106602226 A | 4/2017 |
| CN | 108258396 A | 7/2018 |
| DE | 102010064086 A1 | 6/2012 |
| JP | 241486 A | 9/2005 |
| WO | WO 2012/084844 A2 | 6/2012 |
| WO | WO 2018/093192 A1 | 5/2018 |
| WO | WO 2018/217774 A1 | 11/2018 |

OTHER PUBLICATIONS

Second Office Action for Chinese application No. 201980090505.2 dated Sep. 13, 2022, 8p., in Chinese language.

English language translation of the Second Office Action for Chinese application No. 20190090505.2 dated Sep. 13, 2022, 10p.

Partial Supplementary European Search Report for EP application No. 19 84 9745 dated Feb. 11, 2022, 14p.

First Office Action for Chinese application No. 201980090505.2 dated Mar. 2, 2022, 5p, in Chinese language.

Search Report for Chinese application No. 201980090505.2 dated Feb. 25, 2022, 3p, in Chinese language.

Concise explanation for B12.

International Search Report for priority application No. PCT/CN2019/074638, dated Sep. 30, 2019, 2p.

International Written Opinion for priority application No. PCT/CN2019/074638, dated Sep. 30, 2019, 4p.

ZTE et al., 3GPP TSG RAN WGI Meeting #95 R1-1812732, "Discussion on scynchronization mechanism in NR V2X", Nov. 16, 2018, 5p.

First Examination Report for corresponding Indian application No. 202117034403 dated Feb. 6, 2023, 5p.

Communication pursuant to Article 94(3) EPC dated Jan. 23, 2026 for European Patent Application No. 19 849 745.5 (6 pages).

* cited by examiner

Surrounding area

Vehicle projection: projection of the first layer of space, or projection of the second layer of space Central area

334

332

Tx    Rx

Transmit signal generator

Multi-user detector and
self-interference canceller

| 1 | 2 | 3 | 4 | 5 | 6 |

V2V Information Contained
a) Occupied channel index
b) Information of the spreading code or pilot used in each occupied channel.
c) Vehicle condition information, operational information or information associated with one or more sensors of the vehicle.

1000

| Memory 1005 | Processor(s) 1010 |
| One or more transmitters 1015 | One or more receivers 1020 |
| One or more transmit antennas 1025 | One or more receive antenna 1030 |

FULL-DUPLEX COMMUNICATION METHODS AND APPARATUS

RELATED APPLICATION

This application is a continuation of International Application No. PCT/CN2019/074638, filed Feb. 2, 2019, the entirety of which is hereby incorporated by reference.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

This patent document describes a full duplex communication method and apparatus for inter-vehicle communication (V2V). The described techniques can assist a driver of a vehicle as the vehicle transmits information to or receives information from vehicles surrounding the driver, or the described techniques can assist a vehicle to operate in an autonomous driving mode.

In a first exemplary embodiment, a communication apparatus, comprises a transmit antenna and a receive antenna, where a distance between the transmit antenna and the receive antenna is greater than a pre-determined value, where the transmit antenna and the receive antenna are respectively located on or in a first side and a second side of a vehicle, and where the first side is opposite to the second side. The communication apparatus of the first exemplary embodiment also includes a processor configured to generate one or more messages to be transmitted via the transmit antenna, where the one or more messages includes vehicle condition information, operational information about a driver of the vehicle, or information associated with one or more sensors of the vehicle.

In a second exemplary embodiment, a communication apparatus comprises a transmit antenna and a receive antenna, where a distance between the transmit antenna and the receive antenna is greater than a pre-determined value, and where the transmit antenna and the receive antenna are respectively located on two end points of a diagonal line that extends from one end of a vehicle to another end of the vehicle. The communication apparatus of the second exemplary embodiment also includes a processor configured to generate one or more messages to be transmitted via the transmit antenna, where the one or more messages includes vehicle condition information, operational information about a driver of the vehicle, or information associated with one or more sensors of the vehicle.

In some implementations of the first and second exemplary embodiment, the transmit antenna and the receive antenna are located on or in a middle region of the first side and the second side, respectively.

In some implementations of the first and second exemplary embodiment, the transmit antenna and the receive antenna are located respectively in a first region and a second region of the vehicle, and the first region is located above the second region.

In a third exemplary embodiment, a communication apparatus comprises a transmit antenna and a plurality of receive antennas, where a distance between the transmit antenna and each receive antenna is greater than a pre-determined value. The communication apparatus of the third exemplary embodiment also includes a processor configured to generate one or more messages to be transmitted via the transmit antenna, where the one or more messages includes vehicle condition information, operational information about a driver of the vehicle, or information associated with one or more sensors of the vehicle.

In some implementations of the third exemplary embodiment, a first receive antenna and a second receive antenna are respectively located on two end points of a diagonal line that extends from one end of the vehicle to another end of the vehicle. In some implementations of the third exemplary embodiment, a first receive antenna is located on or in a middle region of a first side of the vehicle, and the second receive antenna is located on or in a middle region of a second side of the vehicle, where the first side is opposite to the second side. In some implementations of the third exemplary embodiment, the first receive antenna and the second receive antenna are located respectively in a first region and a second region of the vehicle, and the first region is located above the second region.

In some implementations of the third exemplary embodiment, four receive antennas are located on or in four sides of the vehicle or four corners of the vehicle. In some implementations of the third exemplary embodiment, six or eight receive antennas are evenly distributed around the vehicle. In some implementations of the third exemplary embodiment, the transmit antenna is located on or in a central region of a top surface of a vehicle.

In a fourth exemplary embodiment, a communication apparatus comprises two transmit antennas and a plurality of receive antennas, where a distance between each transmit antenna and each receive antenna is greater than a pre-determined value, and where the two transmit antennas are located on or in central region of a top surface of a vehicle. The communication apparatus of the fourth exemplary embodiment also includes a processor configured to generate one or more messages to be transmitted via one of the two transmit antennas, where the one or more messages includes vehicle condition information, operational information about a driver of the vehicle, or information associated with one or more sensors of the vehicle.

In some implementations of the fourth exemplary embodiment, two receive antennas are located on or in one side of the vehicle. In some implementations of the fourth exemplary embodiment, four receive antennas are located on or in four sides of a vehicle or four corners of a vehicle. In some implementations of the fourth exemplary embodiment, six or eight receive antennas are evenly distributed around a vehicle.

In some implementations of the fourth exemplary embodiment, two receive antennas are located on or in a central region of a top surface of the vehicle. In some implementations of the fourth exemplary embodiment, four receive antennas are located on or in a central region of a top surface of the vehicle In some embodiments, in the transmitter side, an additional partial scrambling process is applied. The scrambling sequence of a certain part of the transmitted messages are generated or related to a certain part of the payload whose information (e.g. the bit index within the coded bits) is known to the BS.

In some embodiments, the communication apparatus further includes one or more attenuators located proximate to one or more receive antenna, where an attenuator is located between each receive antenna and at least one transmit antenna, and where the attenuator is structured to attenuate wireless signals transmitted by the at least one transmit antenna.

In some embodiments, the processor is configured to modulate the one or more messages by using binary phase shift keying (BPSK) modulation, $\pi/2$-BPSK modulation, or quadrature phase shift keying (QPSK) modulation, where the one or more messages includes the generated digital modulation symbols. In some embodiments, the processor is configured to modulate the one or more messages by using differential binary phase shift keying (DBPSK) modulation, differential $\pi/2$-BPSK ($\pi/2$-DBPSK) modulation, or differential quadrature phase shift keying (DQPSK) modulation, where the one or more messages includes the generated digital modulation symbols.

In some embodiments, the processor is configured to generate one or more spreading codes to spread symbols of the one or more messages, where the one or more spreading codes are generated according to information of spreading code included in the messages to be transmitted, or the processor is configured to select one or more spreading codes to spread symbols of the one or more messages, where the one or more spreading codes are selected from a spreading code set according to information of spreading code included in the messages to be transmitted.

In some embodiments, signals generated and transmitted by the vehicles/devices include a symbol scrambling procedure, where the modulation symbols are scrambled by a scrambling sequence. In some embodiments, signals generated and transmitted by the vehicles/devices include a bit interleaving procedure, where the FEC coded bits are interleaved by a interleaver.

In some embodiments, the processor is configured to generate pilot signal according to information of a pilot signal included in the messages to be transmitted, or the processor is configured to select pilot signal to spread symbols of the one or more messages, where the pilot signal is selected from a pilot signal set according to the information of the pilot signal included in the messages to be transmitted, where the pilot signal is transmitted with the message.

In some embodiments, the processor is configured to scramble at least one part of the message with a scrambling sequence. In some embodiments, a generation of the scrambling sequence is determined at least from certain coded bits from a payload part. In some embodiments, the certain coded bits include at least a plate information.

In some embodiments, one or more receive antennas are configured to receive signals from one or more other vehicles. In some embodiments, the vehicle condition information includes a vehicle identification, a license plate number, a current location of the vehicle, a speed of the vehicle, a size of the vehicle, or a color of the vehicle. In some embodiments, the operational information about the driver of the vehicle includes information associated with an ongoing operation performed by the driver or information associated with an operation that is to be performed by the driver. In some embodiments, the ongoing operation includes braking the vehicle, starting the vehicle, accelerating the vehicle, changing a road lane of the vehicle, or steering the vehicle. In some embodiments, the operation that is to be performed includes preparing for braking the vehicle, preparing to start the vehicle, preparing to accelerate the vehicle, preparing to change a road lane of the vehicle, preparing to steer the vehicle.

In some embodiments, the one or more messages is transmitted via at least one transmit antenna on a plurality of transmission channels. In some embodiments, the plurality of transmission channels is selected from a set of transmission channels according to information of the plurality of transmission channels included in the messages to be transmitted. In some embodiments, the one or more messages includes a channel index information of the plurality of transmission channels used to transmit the one or more messages.

In some embodiments, the processor is configured to generate one or more spreading codes to spread symbols of the one or more messages according to information of spreading codes included in the messages to be transmitted, or the processor is configured to select one or more spreading codes from a spreading code set to spread symbols of the one or more messages according to the information of spreading codes included in the messages to be transmitted.

In some embodiments, each of the one or more messages transmitted using the plurality of transmission channels includes seed values of the spreading codes or the initial states of the spreading codes or the indexes of the spreading codes associated with the spreading code set. In some embodiments, each of the one or more messages transmitted using the plurality of wireless channels includes a pilot signal, each pilot signal is generated according to the information of the pilot signal included in the messages to be transmitted, or where each pilot signal is selected from a set of pilot signals according to the information of the pilot signal included in the messages to be transmitted. In some embodiments, each of the one or more messages includes a seed value of the pilot signal, or each of the one or more messages includes an initial state of the pilot signal, each of the one or more messages includes an index of the pilot signal associated with the set of pilot signals.

In some embodiments, the transmit power of the message is boosted a pre-determined value if the message includes some pre-determined emergency signal. In some embodiments, the pre-determined emergency signal includes emergency braking the vehicle, emergency accelerating the vehicle, or emergency changing a road lane of the vehicle. In some embodiments, the driver includes an autonomous driving system of the vehicle. In some embodiments, a method of wireless communication, comprises performing a wireless transmission or a wireless reception using the communication apparatus recited in any one or more of embodiments above. In some embodiments, at least one transmit antenna and one or more receive antennas are configured to perform full-duplex communication.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figures 1A, 1B:
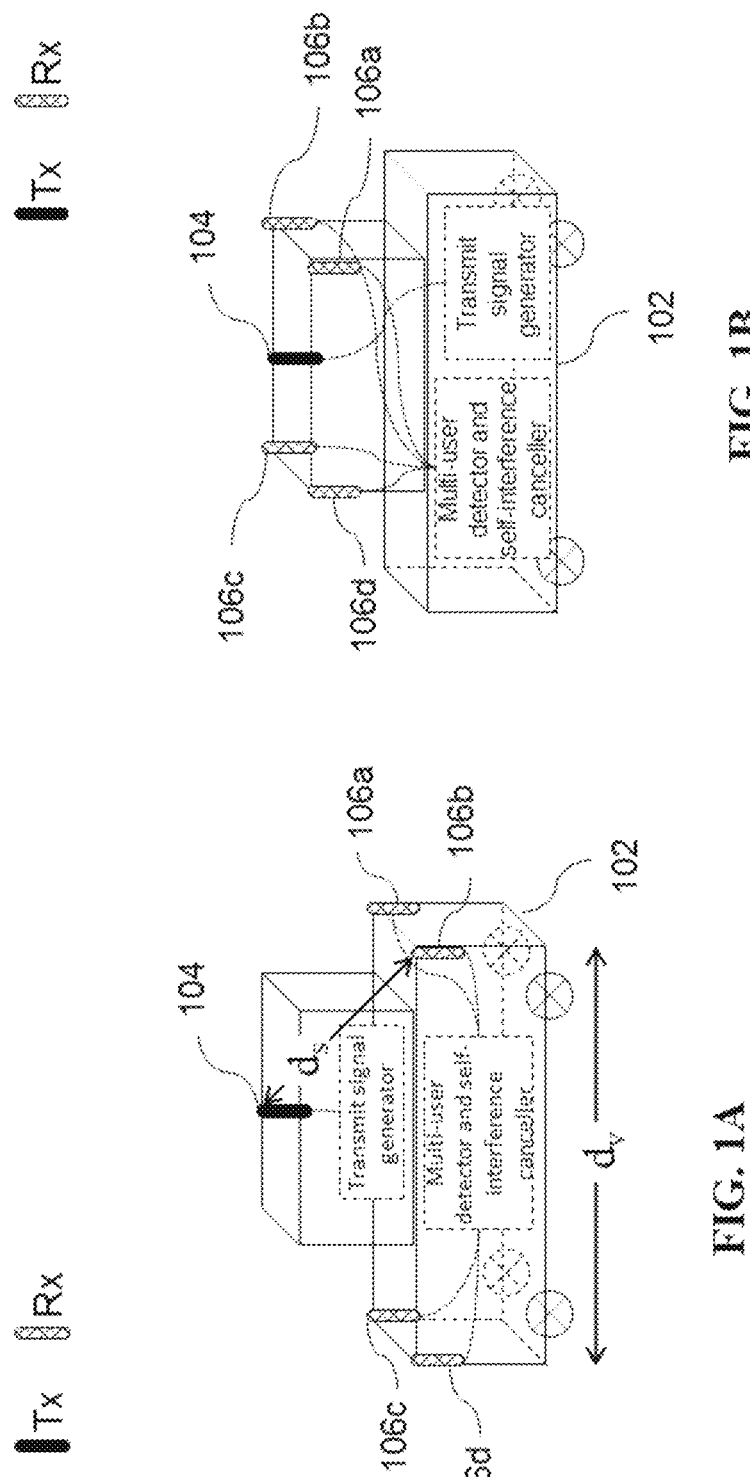
FIGS. 1A and 1B shows exemplary communication apparatus for full-duplex vehicle-to-vehicle (V2V) or device-to-device (D2D) communication.

Vehicle-to-Vehicle (V2V) refers to an exchange of information between vehicles. The most common form of V2V communication is between vehicles. In this patent document, the term vehicle can include a car, a bicycle, an electric car, a scooter, a boat, an airplane, or a train. Thus, V2V inter-vehicle communication can also be referred to as vehicle networking. In addition, in some Device-to-Device (D2D) networks, there are similarities between information exchange between devices and V2V information exchange. Therefore, techniques described in this patent document can also be applicable to D2D full-duplex information interaction. Further, the techniques described in this patent can also be applicable to Vehicle-to-Everything (V2X) communication.

Vehicle networking communication may often require low latency and high reliability to effectively prevent or avoid accidents. If the communication method based on the traditional central controller (such as base station) architecture is used, the information between the vehicles is required to pass through the base station, which can be considered an indirect communication leading to two serious problems. First, such a conventional architecture results in a large delay, which makes the conventional architecture unsuitable to meet the needs of the V2V inter-vehicle communication or Internet of Vehicles (IOV) framework. Second, when the traffic volume is large, a large number of very frequent communications may occur, and a base station in a conventional architecture may be overwhelmed, resulting in communication congestion and difficulty in meeting the low latency and high reliability requirements of the V2V communication.

In the vehicle network information exchange, the exchange of vehicle information between a vehicle and an adjacent vehicle is important, and the closer the vehicles, the more important the exchange of vehicle information. Therefore, vehicle network communication is often considered to bypass the base station and adopt direct communication between vehicles to reduce the delay. However, because inter-vehicle communication does not have a base station acting as a central controller to coordinate and/or schedule the communication resources (e.g., the transmission channels, the time-frequency slots, transmission signature such as spreading code, scrambling code, preamble sequence, demodulation reference signal (DMRS) sequence, etc.) for each vehicle, the transmission signal generation involving the use of transmission signatures and the selection of transmission channels or slots of the vehicle may be autonomously determined by the vehicle. From the perspective of the V2V network system, such transmission signatures and transmission resources can be determined individually by each vehicle and can be unrelated or even random. In this way, the transmission between vehicles is prone to collision and aliasing, which brings challenges to multi-user detection (MUD), which in turn affects the reliability of the inter-vehicle communication.

Communication may often require some level of synchronization, such as frequency synchronization, frame synchronization, symbol synchronization etc., to ensure the performance and ease the demodulation. The inter-vehicle direct communication seeks the advantage of bypassing the base station, which introduces a difficulty of inter-vehicle synchronization. A common synchronization source can be used to ease the inter-vehicle synchronization. That is each vehicle can synchronize to the common synchronization source before its transmission.

Multi-path wireless channel and residual timing synchronization error can make the detection or equalization of V2V direct communication difficult. In order to ease the detection or equalization operation, Orthogonal Frequency Division Multiplexing (OFDM) or Discrete Fourier Transform Spread OFDM (DFT-S-OFDM) with a long enough cyclic prefix (CP) can be used to generate the transmit waveform of all the vehicles. A long enough CP can include a CP longer than the sum of delay spread of the multi-path wireless channel and any residual timing synchronization error.

V2V provides for exchange of vehicle information between adjacent vehicles, and D2D direct communication tends to be more efficient. However, the D2D communication used by the conventional V2V technology is half-duplex. For example, if a certain vehicle A transmits a signal on channel 1, it cannot receive signals on channel 1 at the same time, but can only receive on channel 2. Thus, there is a problem with the half-duplex mechanism where vehicle A may transmit a signal on channel 1 but cannot receive information from other vehicles that may also transmit a message on channel 1. This means that near half of target vehicles information may be missed by a vehicle, which affects the reliability of the V2V communication significantly.

FIGS. 1A and 1B shows exemplary communication apparatus for full-duplex V2V or D2D communication. In FIGS. 1A and 1B, the vehicle 102 is equipped with a separate transmit and receive antennas to transmit and receive signals on the same time-frequency resources. The distance between the one transmit antenna 104 and the plurality of receive antennas 106a-106d is as large as possible to make full use of the size of the vehicle. In some embodiments, the distance between the one transmit antenna 104 and each of the receive antennas 106a-106d, $d_s$, is greater than a pre-determined value, which is related to the length of the vehicle $d_v$. For example, the pre-determined value can be close to $d_v/2$ so that the transmit antenna and the receive antenna can be separated as much as possible by the length of the vehicle body. The transmit signal generator included in each vehicle generates a transmission signal message that may include vehicle condition or status information, operational information about the driver of the vehicle, information sensed by one or more sensors in the vehicle, and/or information to allow a receiver to perform multi-user detection information. The term driver used in this patent document may include a human driver of a vehicle or an autonomous driving system that may be based on artificial intelligence (AI) technology. As further described in this patent document, the transmit signal generator may use symbol spreading technology to generate the transmission signal and the spreading code or sequence used by the vehicle is autonomously determined by the vehicle according to the spreading code information included in the vehicle's message to be transmitted. In other words, the vehicle's transmit message includes the information of the spreading code used by it. And, as further described in this patent document, the multi-user detector includes a blind multi-user detection technology, and the self-interference canceller. It can facilitate the blind multi-user detection if the spreading code information is included in the vehicle's transmit message. Because once the vehicle's message is successfully decoded, the spreading code can be determined and a precise reconstruction of the spread symbols can be perform, which facilitate the elimination of the successfully decoded vehicle's signal.

To perform full-duplex communications, the following two criteria can be used to determine the locations for the antennas on or in a vehicle: (1) the distance between the transmit antenna and the receive antenna is as large as possible, so that self-interference from the transmit to the receive antenna is as small as possible; (2) the distances between multiple receive antennas are as large as possible, so that (a) the reception of signals from surrounding vehicles can be more uniform and more uncorrelated (b) the reception of self-interference can also be more uniform and more uncorrelated, thus the performance of MUD receiver and self-interference canceller can be improved. These two criteria can be realized by placing or installing the transmit and receive antennas as described below and in this patent document.

Figure 2A:
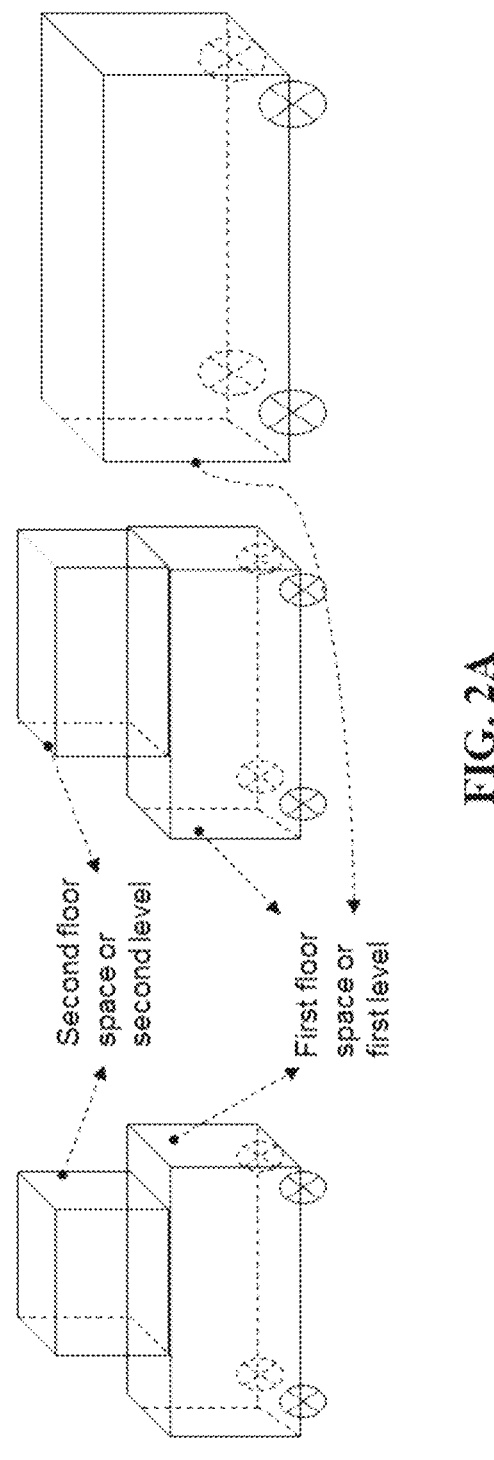
FIGS. 2A and 2B describe a general construction of some vehicles that can be used to determine antenna placement in or on a vehicle.
Figure 2B:
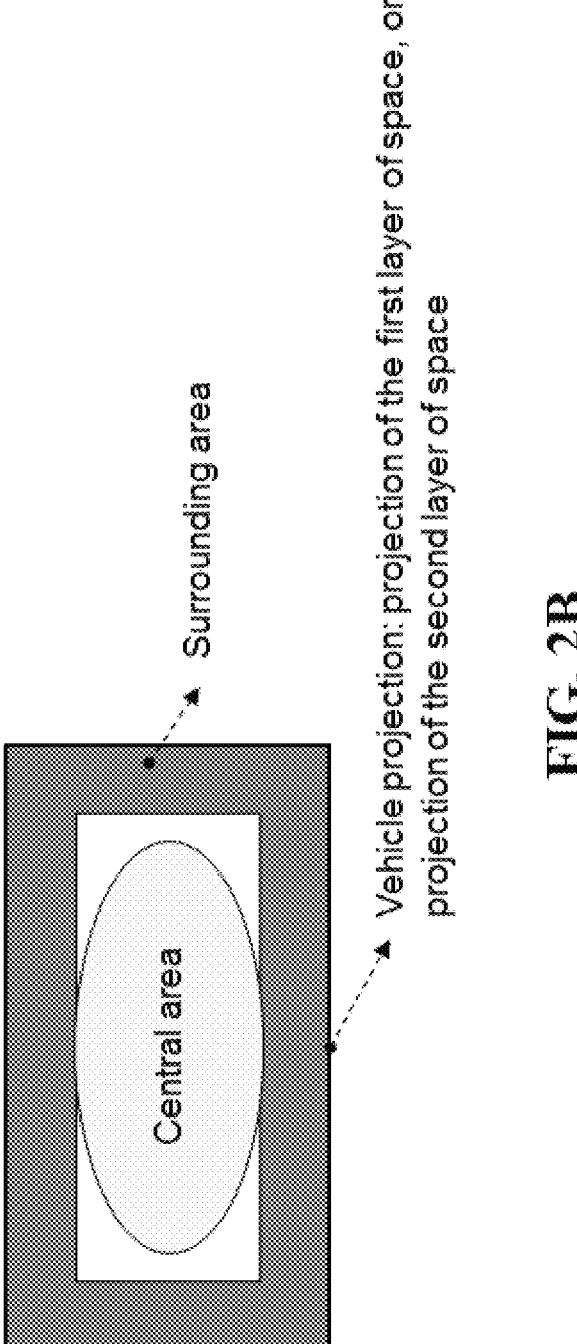

FIGS. 2A and 2B describe a general construction of some vehicles that can be used to determine antenna placement in or on the vehicles as further described in this patent document. FIG. 2A shows a three-dimensional view of three vehicles. Vehicles 202 and 204 in FIG. 2A describe some vehicles, such as a car, that have two layers or levels of space. The two levels can be broken up into the first level or the first-floor space and the second level or the second-floor space, where the first level is located below the second level. As an example, in a car, the area comprising the windows of the car up to the top surface (or roof) of the car can be considered the second level, and the area in the car below the windows down to the bottom surface (or floor) of the car can be considered first level. Vehicle 206 describes some vehicles (e.g., van, bus, large truck) that have only one level of space floor.

FIG. 2B shows a top view of an example vehicle. The top view shows a top surface of the vehicle with a central area or region. The top view also shows an area surrounding the central area (shows as "vehicle projection" area in FIG. 2B), which may or may not be on the same level as the top surface. In some cases, a vehicle such as a car may have a central area located in the second level and the vehicle projection area on the first level. In some other cases, a vehicle such as a commercial bus may have a central area and the vehicle project area on a same level.

FIGS. 3A-3D shows exemplary placement of one transmit antenna and one or more receive antennas on or in a vehicle. In FIGS. 3A-3D, each transmit antenna and each receive antenna can be electrically connected to a transmit signal generator and a multi-user detector and self-interference canceller.

Figure 3A:
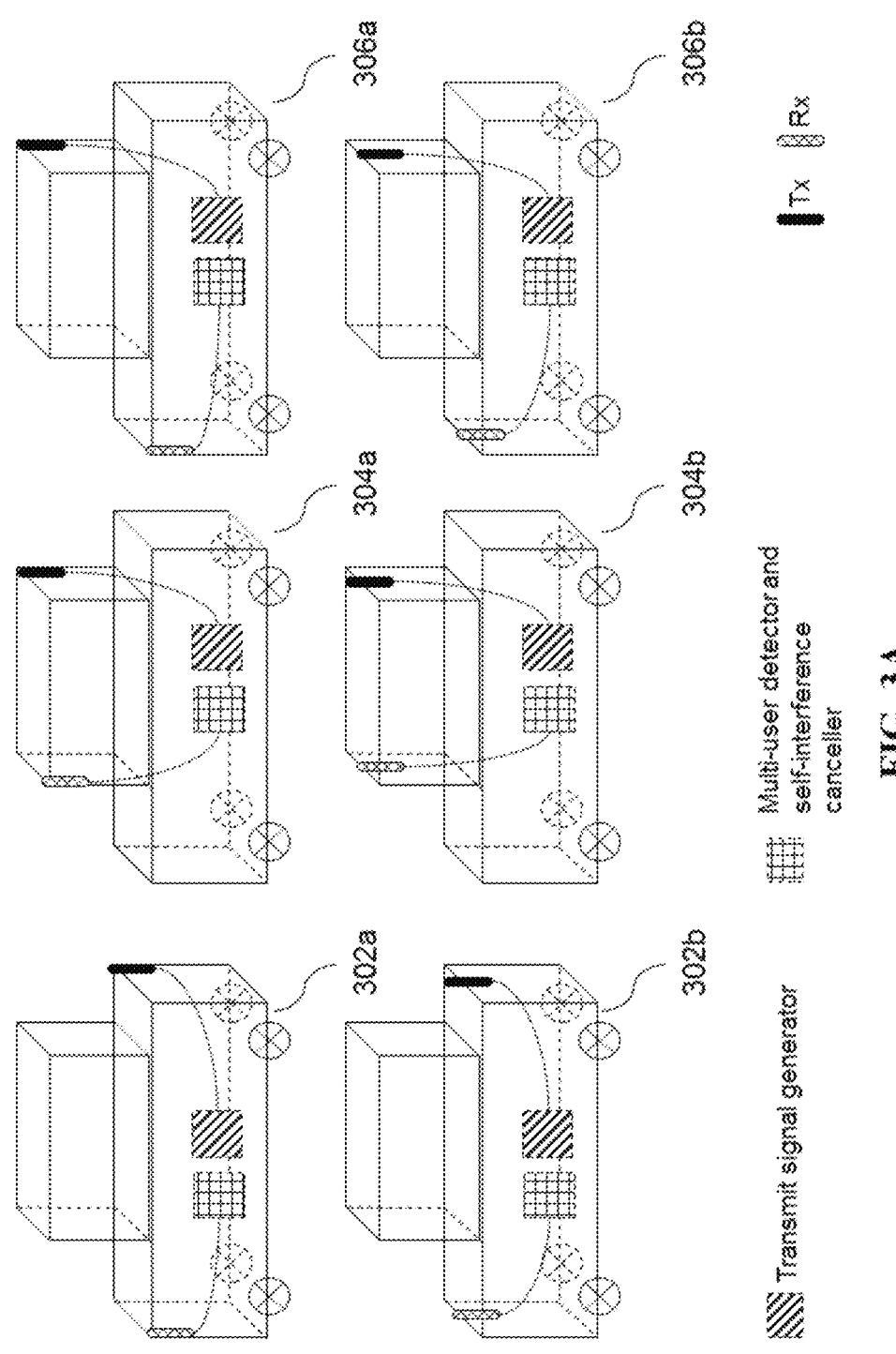
FIGS. 3A-3D shows exemplary placement of one transmit antenna and one or more receive antennas on or in a vehicle.

FIG. 3A shows three exemplary placements of one transmit antenna and one receive antenna on or in a vehicle. In the leftmost vehicle 302a and in the middle vehicle 304a, the antennas are placed or installed on or in the vehicle on two diagonally opposing end points on an imaginary line extending in a same level (e.g., the first level in vehicle 302a, the second level in vehicle 304a). In the rightmost vehicle 306a, the antennas are placed on or in the vehicle on two diagonally opposite end points on an imaginary line extending from the first level to the second level. As shown in FIG. 3A, the transmit and receive antennas may be placed in or on opposite corner region of the vehicle on the same level or on different levels. In some embodiments, the one transmit antenna may be placed on or in a middle region of a first side of a vehicle 302b, 304b on one level and the one receive antenna can be placed on or in a middle region of a second side opposite to the first side and on the same level as the transmit antenna. In some embodiments, the one transmit antenna may be placed on or in a middle region of a first side of a vehicle 306b on one level and the one receive antenna can be placed on or in a middle region of a second side opposite to the first side and on a different level than the level where the transmit antenna is placed. The term "side" used in this patent document may include a vertical side region of a vehicle such as doors or door panel, front bumper, or the rear bumper.

Figure 3B:
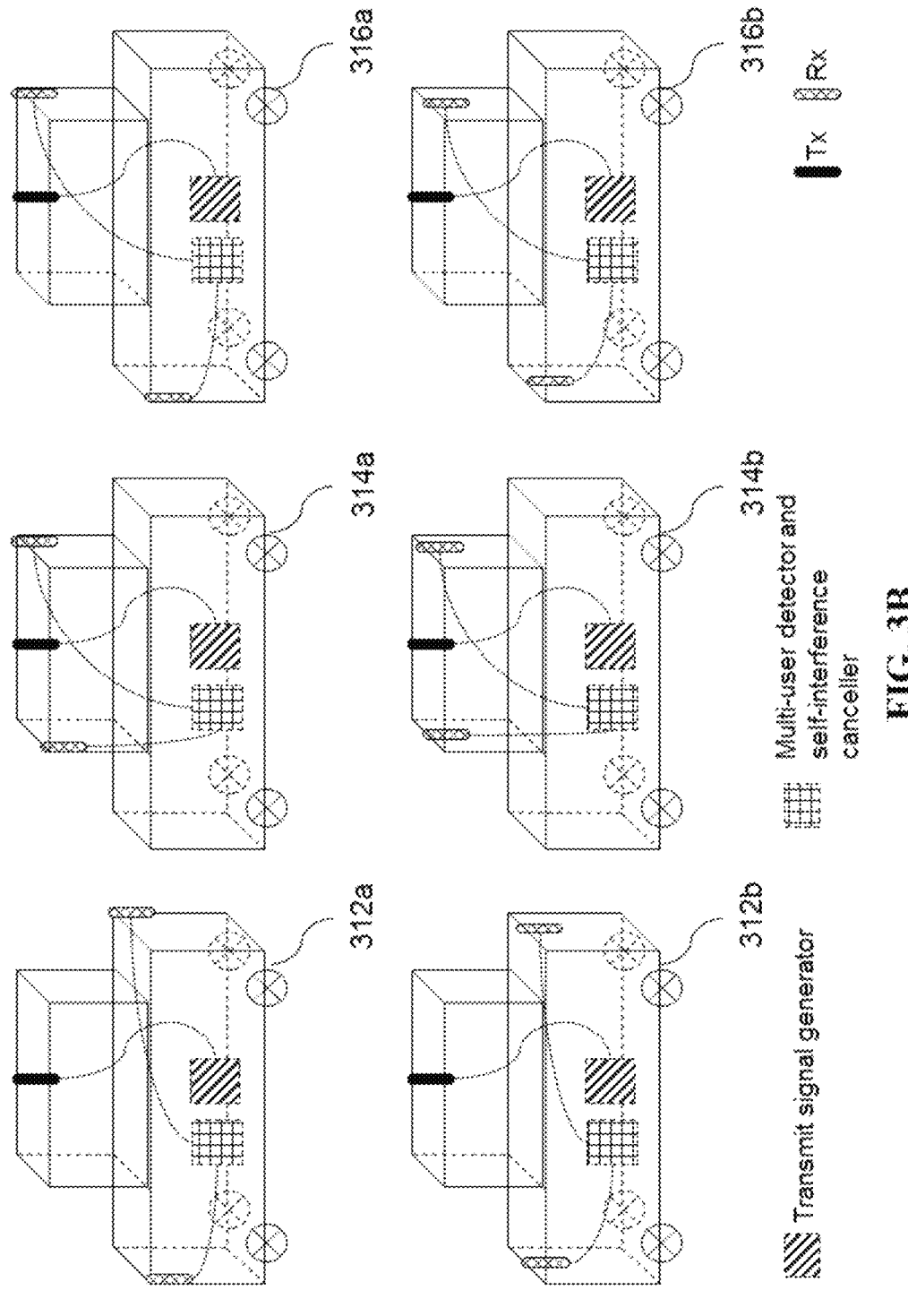

FIG. 3B shows three exemplary placements of one transmit antenna and two receive antennas on or in a vehicle. For each of the six vehicles in FIG. 3B, the transmit antenna is placed or located on or in a central area or region on a top surface of the vehicle, and the two receive antennas are placed in or on a surrounding area of the vehicle. In the leftmost vehicle 312a and in the middle vehicle 314a, the two receive antennas are placed or installed on or in the vehicle on two diagonally opposing end points on an imaginary line extending in a same level (e.g., the first level in vehicle 312a, the second level in vehicle 314a). In the rightmost vehicle 316a, the two receive antennas are placed on or in the vehicle on two diagonally opposite end points on an imaginary line extending from the first level to the second level. As shown in vehicles 312a, 314a, 316a, the two receive antennas may be placed in or on opposite corner region of the vehicle on the same level or on different levels. In some embodiments, a first receive transmit antenna may be placed on or in a middle region of a first side of a vehicle 312b, 314b on one level and a second receive antenna can be placed on or in a middle region of a second side opposite to the first side and on the same level as the first receive antenna. In vehicle 312b, the two receive antennas may be located a level that is different from the level where the transmit antenna is located. In vehicle 314b, the two receive antennas may be located a level that is same as the level where the transmit antenna is located. In some embodiments, the first receive antenna may be placed on or in a middle region of a first side of a vehicle 316b on one level and the second receive antenna can be placed on or in a middle region of a second side opposite to the first side and on a different level than the level where the first receive antenna is placed.

Figure 3C:
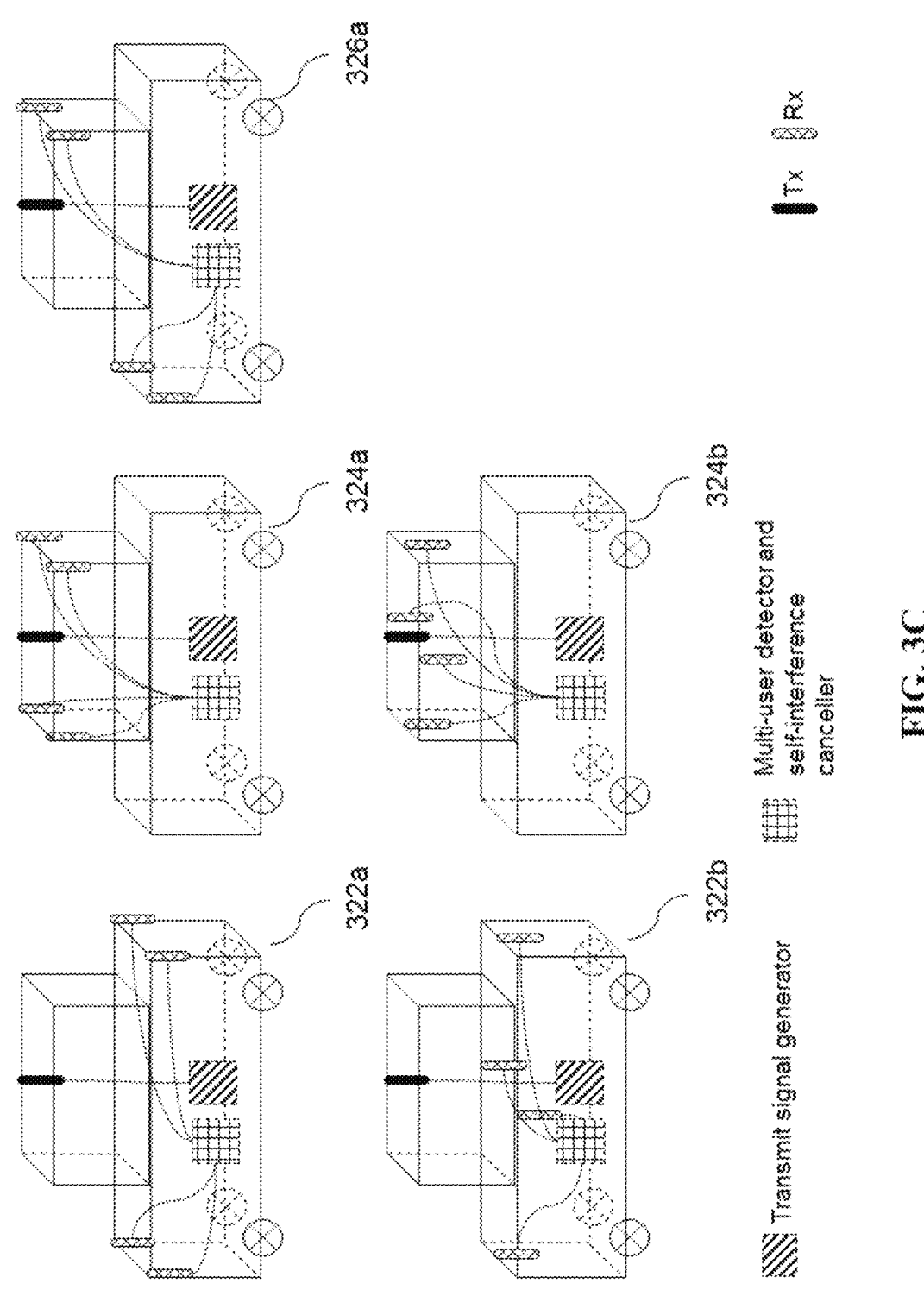

FIG. 3C shows three exemplary placements of one transmit antenna and four receive antennas on or in a vehicle. For each of the six vehicles in FIG. 3C, the transmit antenna is placed or located on or in a central area or region on a top surface of the vehicle, and the four receive antennas are placed in or on a surrounding area of the vehicle. In the leftmost vehicle 322a and in the middle vehicle 324, the four receive antennas are placed or installed on or in the vehicle on four corners in a same level (e.g., the first level in vehicle 322a, the second level in vehicle 324a). In the rightmost vehicle 326a, a first and second receive antennas are placed on or in the vehicle on first side of the first level and a third and fourth receive antennas are placed on or in the vehicle on a second side on the second level, where the second side is opposite to the first side. As shown in FIG. 3C, the four receive antennas may be placed in or on four corner regions of the vehicle on the same level or on different levels. In some embodiments, the four receive antennas may be placed one or in a middle region of the four sides of a vehicle 322b, 324b. In some embodiments, the four receive antennas may be on the same level as the transmit antenna (as shown in vehicle 324b), and in some embodiments, the four receive antennas may be located on a level different from the level where the transmit antenna is located (as shown in vehicle 322b).

Figure 3D:
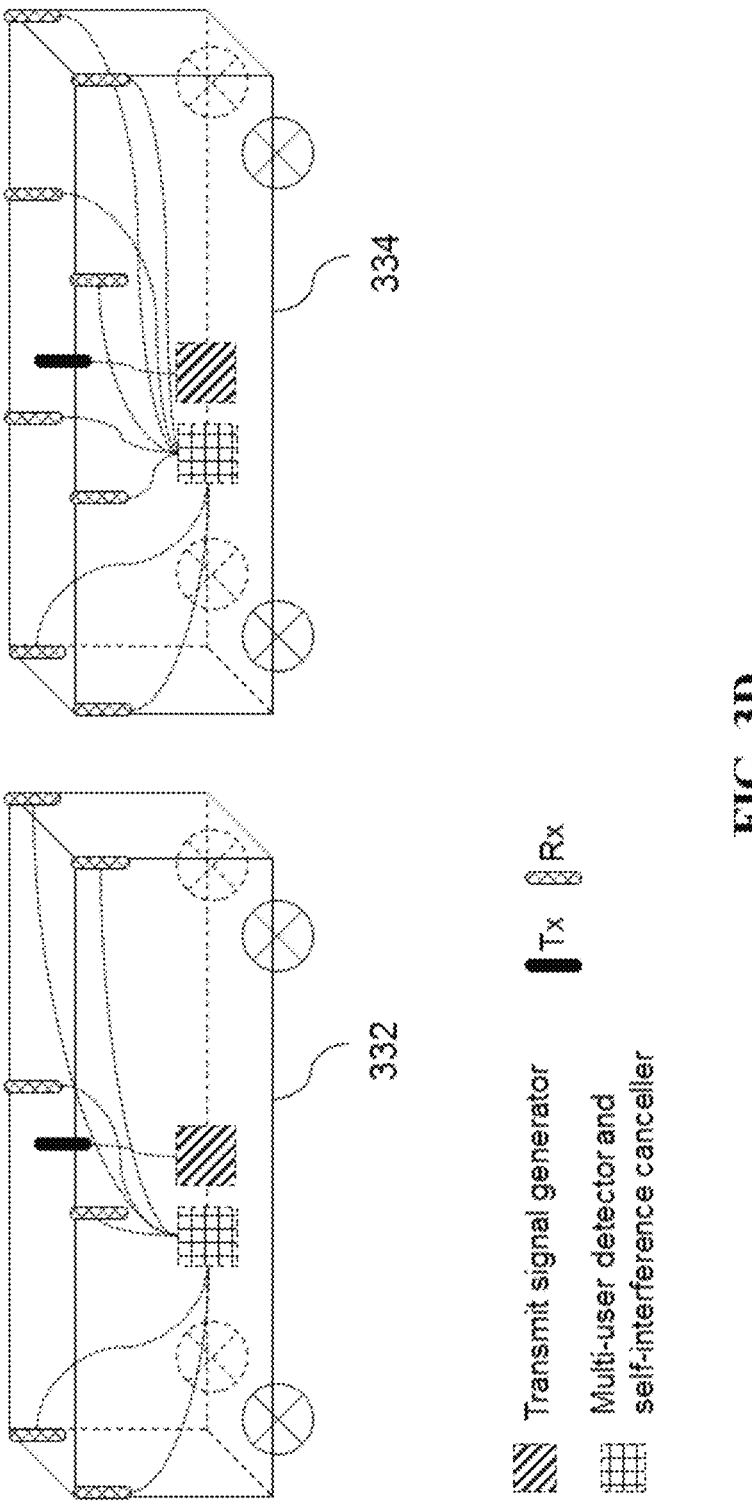

FIG. 3D shows two exemplary placements of one transmit antenna and six or eight receive antennas on or in a vehicle. As shown in FIG. 3D, the six or eight receive antennas can be evenly distributed around the body of the vehicle. For each of the two vehicles in FIG. 3D, the transmit antenna is placed or located on or in a central area or region on a top surface of the vehicle, and the six or eight receive antennas are placed in or on a surrounding area of the vehicle. In vehicle 332, four of the six receive antennas are placed or installed on or in the vehicle on four corners in a same level, and the remining two receive antennas are placed in approximately the middle of two sides of the vehicle on the same level as the four receive antennas. In the vehicle 334, four of the eight receive antennas are placed or installed on or in the vehicle on four corners in a same level, and the remining four receive antennas are placed in or on two sides of the vehicle on the same level as the other four receive antennas. In vehicle 334, each of the four receive antennas on one side may be equidistant from an adjacent receive antenna on that one side.

FIGS. 3B to 3D show that the plurality of receiving antennas are in a surrounding area of the first layer space or in a surrounding area of the second layer space. In some embodiments, as shown in FIGS. 3A-3D, a single transmit antenna is used because the signal of each vehicle in V2V direct communication is broadcasted, and multiple transmitting antennas that simultaneously broadcast signals may cause interference.

In some other embodiments, a vehicle can be equipped with multiple transmit antennas, where the vehicle that broadcasts its own signal may use only one of the transmit antennas at one transmit instant to do so.

In embodiments employing multiple transmit antennas, the transmit antennas may not be placed on a central region of a top surface of the vehicle. One or more receive antennas may be placed as described in FIGS. 3A-3D. For example, two transmit antennas are arranged in a central area of a top surface of the vehicle, and two or more receive antennas are in the area around the vehicle. In embodiments employing multiple transmit antennas, only one of the transmit antennas can be used each time a signal is transmitted. In some embodiments, a plurality of receive antennas are uniformly distributed in the surrounding area of the vehicle and one or more transmitting antennas may not be confined to the central region.

Figure 4:
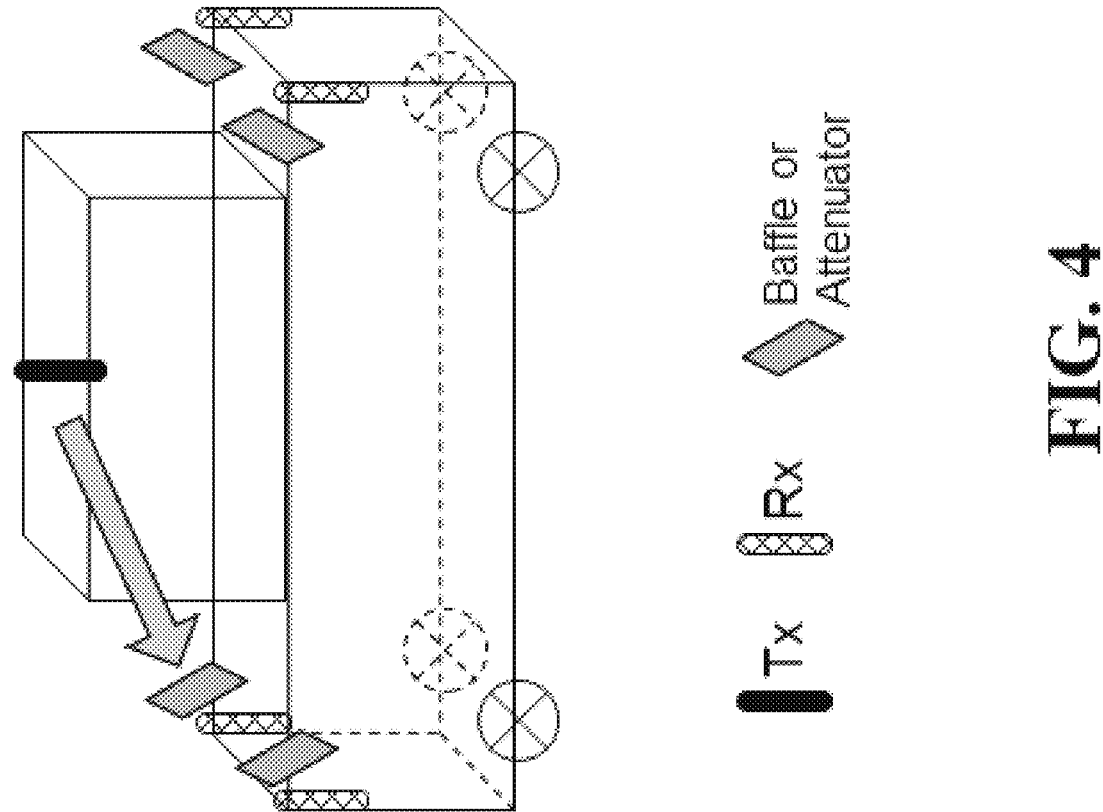
FIG. 4 shows a placement of one or more baffles near or proximate to one or more receive antennas.

FIG. 4 shows a placement of one or more baffles near or proximate to one or more receive antennas. In the vicinity of each receiving antenna, an appropriate baffle or attenuator can be placed to attenuate the wireless signal emitted by the transmitting antenna of the vehicle. The baffle or attenuator is usually disposed on an imaginary line between the transmit antenna and the receive antenna of the vehicle, and has a good attenuation effect on the self-interference signal of the vehicle when the vehicle is performing full-duplex communications. A signal transmitted by an adjacent vehicle to be received by one of the four receive antennas in FIG. 4 is not as much attenuated by the baffle or attenuator because the baffle is not placed between the receive antenna of one vehicle and a transmit antenna of another adjacent vehicle.

In some embodiments, the vehicle may use the one or more transmit antennas as described in this patent document to transmit a signal that includes any one or more of the following information: (1) vehicle condition information, (2) operational information about the driver of the vehicle, (3) information sensed by one or more sensors in the vehicle, and (4) information to allow a receiver to perform multi-user detection information (e.g., the information may include information of spreading sequence or spreading code used by the transmitter or information of pilot signal (such as Preamble sequence or DMRS)). The four pieces of information described above can be encoded and then modulated by the transmit signal generator. The vehicle condition information may include a vehicle identification, a license plate number, a current location of the vehicle, a speed of the vehicle, a size of the vehicle, or a color of the vehicle. The operational information about the driver of the vehicle may include information associated with an ongoing operation performed by the driver or information associated with an operation that is to be performed by the driver. In some embodiments, the ongoing operation includes braking the vehicle, starting the vehicle, accelerating the vehicle, changing a road lane of the vehicle, or steering the vehicle. In some embodiments, the operation that is to be performed includes preparing for braking the vehicle, preparing to start the vehicle, preparing to accelerate the vehicle, preparing to change a road lane of the vehicle, preparing to steer the vehicle.

In some embodiments, the transmit signal generator generates transmission signals using symbol spreading techniques. For example, each vehicle or user equipment (UE) spreads its digital modulation information symbols using an N-length spreading code or spreading sequence $\{c_k\}$. Let K denote the number of simultaneously active vehicles around a given vehicle (in an interesting range around a given vehicle). In an example scenario, if all the vehicles deployed a single transmit (TX) antenna and a single receive (RX) antenna, the digital received signal vector $y \in \mathbb{C}^N$, where N is the number of frequency domain resource elements (REs) spanned by the N-length spreading vector and carry the same digital modulation symbols, at the given vehicle can be written as $$y = c_0 \odot h_0 s_0 + \sum_{k=1}^{K} c_k \odot h_k s_k + w,$$

where $h_k$ is the channel vector between the transmit antenna of the k-th vehicle and the receive antenna of the given vehicle, $s_k$ is the digital modulation symbol of the message of the k-th vehicle and the operator $\odot$ stands for the pointwise multiplication or product of two vectors. Note that the N-length spreading code/spreading sequence $\{c_k\}$ also acts as the transmit signature (signature vector).

Specifically, different from half-duplex communication, in full-duplex communication, there is strong self-interference, $c_0 \odot h_0 s_0$, in the digital received signal vector y even with the baffles or attenuators (disposing on an imaginary line between the one or more transmit antennas and the one or more receive antennas of the vehicle) and/or with RF self-interference cancellation. Here, in the self-interference $c_0 \odot h_0 s_0$, $c_0$ is the spreading code using by the given vehicle and $h_0$ is the channel vector between the transmit antenna and the receive antenna of the given vehicle, $s_0$ is the digital modulation symbol of the message of the given vehicle.

As there may be strong self-interference, as well as many target signals superimposed in the received signal vector, the separation of the target information is not easy even by the means of advanced multi-user detection. In order to improve the reliability of multi-user detection, each vehicle's transmit signal generator can modulate its forward error correction (FEC) coded bits by a robust low order modulation scheme, such as binary phase shift keying (BPSK) or quadrature phase shift keying (QPSK), or π/2-BPSK for its further low Peak to Average Power Ratio (PAPR) merit. That is the $s_k$ is the BPSK or QPSK, or π/2-BPSK modulation symbols.

If multiple RX antennas are deployed in the given vehicle, we can form the digital received signal corresponding to a single digital modulation symbol, simply by concatenating the N-length received vector y from each RX antenna. For example, if M RX antennas are deployed in the given vehicle, we can form the M*N digital received signal vector corresponding to a single digital modulation symbol, simply by concatenating the M N-length received vectors from each of the RX antennas.

In some embodiments, the transmit signal generator generates transmission signals without using symbol spreading techniques. In the context of symbol spreading, without symbol spreading can also be regarded as spreading symbols using the degenerate one-length spreading code $\{1\}$. With this degenerate one-length spreading code $\{c_k\}=\{1\}$, the digital received signal vector corresponding to the symbol without spreading can also be written as $$y = c_0 \odot h_0 s_0 + \sum_{k=1}^{K} c_k \odot h_k s_k + w$$

Figure 5:
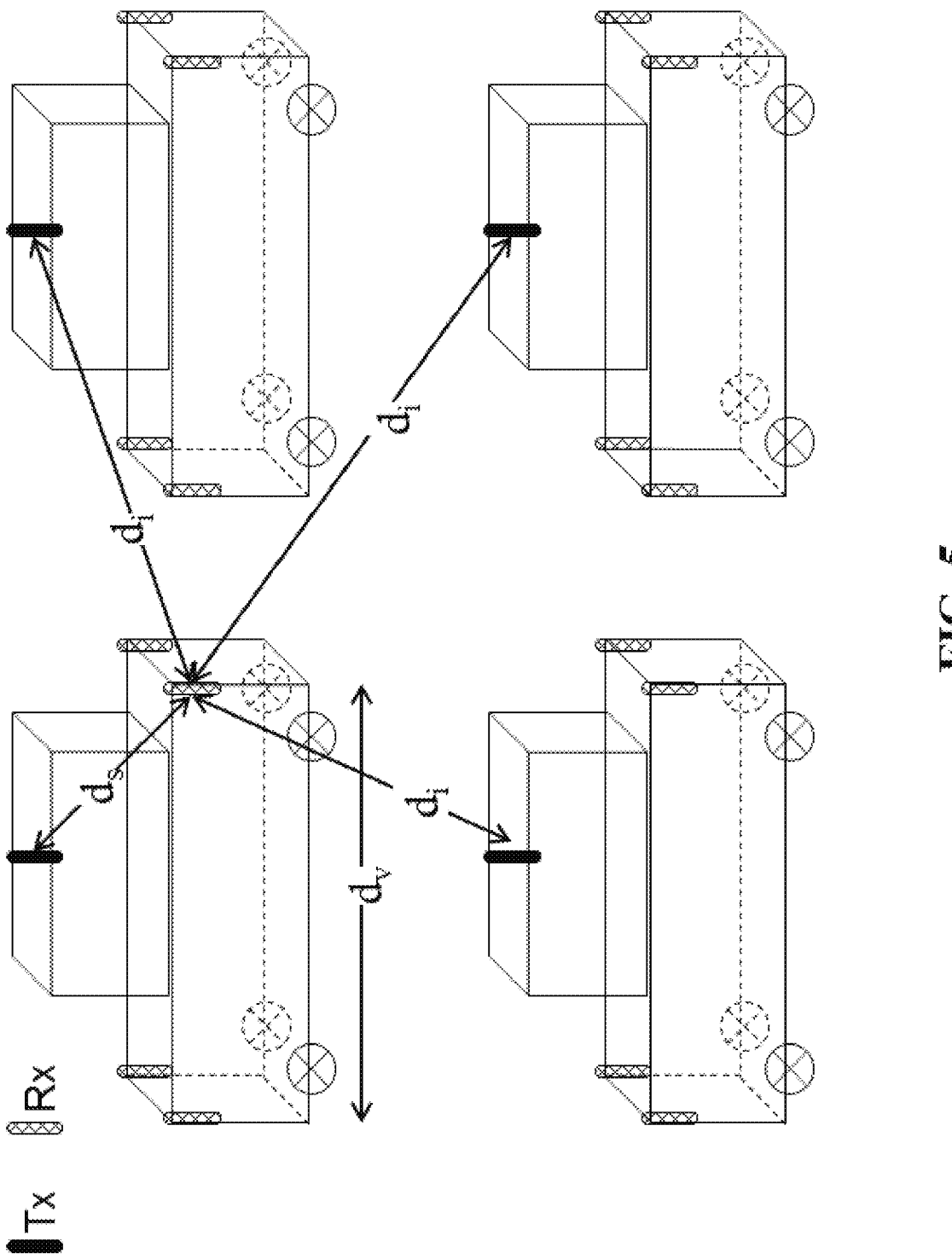
FIG. 5 shows a distance between the transmit and receive antennas of a vehicle compared to distances between a receive antenna of the vehicle and transmit antennas of surrounding vehicles.

The V2V direct communication can employ a much high-efficiency full-duplex communication than other conventional full-duplex, such as cellular full-duplex and WLAN full-duplex, mainly because of the following four aspects:

First, in V2V direct information exchange, the exchange of vehicle information between a vehicle and an adjacent vehicle is important, and the closer the vehicles, the more important the exchange of vehicle information. Meanwhile, the transmit and receive antennas in a vehicle can be separated as much as possible by making full use of the size of the vehicle body to reduce full-duplex self-interference. In contrast in conventional cellular full-duplex and WLAN full-duplex, the transmit and receive antennas in a user terminal (UE) are limited to a relative very small space even separated antenna architecture is used. Such that if the transmit power of each vehicles is equal, the receiver powers of the most important vehicles' information are compared with the full-duplex self-interference. As shown in FIG. 5, assuming the vehicle length is $d_v$, the distance between the transmit antenna and the receive antenna, $d_s$, can be close to $d_v/2$ so that the transmit antenna and the receive antenna can be separated as much as possible by the length of the vehicle body. The distance from the transmit antenna of the other vehicle to the receive antenna of the target vehicle is defined as $d_i$. For the most adjacent vehicles whose information are most important, the difference between $d_i$ and $d_s$ is not too large, as a result, the receive signal strength between the self-interference signal and the target signal of the adjacent vehicle will not be too large even without the baffles/attenuators disposing or without the RF cancellation of self-interference. In contrast, in conventional full-duplex, such as cellular full-duplex and WLAN full-duplex, the receive power of self-interference can be extremely larger than the target signals.

Furthermore, if the baffle or attenuator is added to the self-interference attenuation and the RF cancellation of self-interference is performed, the signal strength of the target adjacent vehicle may even be greater than the residual self-interference. This means that if the baffle or attenuator is added to the self-interference attenuation and the RF cancellation of self-interference is performed, the residual digital self-interference, $c_0 \odot h_0 s_0$, in the above digital receive vector $$y = c_0 \odot h_0 s_0 + \sum_{k=1}^{K} c_k \odot h_k s_k + w,$$

may be smaller than the signals of some target adjacent vehicles. Thus, a digital cancellation of self-interference is more easier than conventional cellular full-duplex. In contrast, in conventional full-duplex, such as cellular full-duplex and WLAN full-duplex, even if the baffle or attenuator is added to the self-interference attenuation and the RF cancellation of self-interference is performed, the residual digital self-interference can still be extremely larger than the target signals, which makes the digital cancellation of self-interference more difficult and finally results a degraded demodulation performance of the target signals Second, in V2V direct information exchange, the information packets exchanged by the vehicles are relative small. Therefore, the V2V signal is generally considered a narrowband signal, and the RF cancellation or analog cancellation of the narrowband self-interference can be easy to implement with good cancellation results. Furthermore, as the V2V direct information exchange is near field communication, the carrier frequency can be relative high, which makes the small packet signal seeming narrower. Thus, RF cancellation or analog cancellation of the more narrowband self-interference can be easier to implement with good cancellation results.

Third, in V2V direct information exchange, regardless of whether full-duplex is used, inter-vehicle communication does not have a base station acting as a central controller to coordinate and/or schedule the communication resources for each vehicle, the transmission signatures and transmission resources can be determined individually by each vehicle and can be unrelated or even random. In this way, the transmission between vehicles is prone to collision and aliasing. Such that even if half-duplex is used, advanced transceiving techniques, such as symbol spreading with elaborate low cross-correlation spreading code set in the transmit side, and successive interference cancellation (SIC) based MUD in the receive side, are needed to facilitate the separation of the multiple vehicles' information. Then these advanced transceiving techniques can also facilitate the cancellation of residual digital self-interference if full-duplex is used.

More specifically, if each vehicle/UE spreads its digital modulation information symbols using an spreading code autonomously selected from a low cross-correlation spreading code set, the residual digital self-interference, $c_0 \odot h_0 s_0$ has certain possibilty with low cross-correlation with the target signal, which could ease the press of the cancellation of residual digital self-interference and improve the demodulation performance of target signal.

Further if SIC-based MUD receiver has been implemented by the given vehicle to separate the superimposed target vehicles' information, then the digital cancellation of self-interference can also take advantage of this already exist SIC-based MUD receiver without introducing any extra implementation overhead. In contrast, digital cancellation of self-interference in conventional cellular full-duplex requires an extra implementation.

More specifically, a vehicle can eliminate self-interference and detects information from other vehicles both through SIC-based MUD receiver, just by regarding the full-duplex self-interference as one target signal. The SIC multi-user detection functions in the following procedure. First a UE detection module will detect the potential UEs/ vehicles and then order the UEs from strong to weak in terms of such metrics as post-SINR. Then a processor associated with a vehicle will demodulate and decode the information of the strong UEs/vehicles and reconstructs the decoded UEs'/vehicles' signal (e.g., re-encoding, modulating, spreading, etc.). After that, the processor cancels the reconstructed signals from the received aggregate signal, and then starts to further detect other potential vehicles/UEs. This iteration will not terminate until all vehicle/UE information is decoded, or none of the rest of the UEs'/vehicles' can be decoded.

In SIC-based MUD receiver, the full-duplex self-interference do not require decoding as the information bits are known prior to the receiver, in this sense the reconstruction of self-interference is easier can other target signals.

To remove the effect of a user/vehicle from the aggregate received signal in the SIC-based MUD receiver, its contribution must be reconstructed from the decoded information. In a channel with wireless multipath and/or Doppler effect, this contribution depends also on the channel. Channel estimate can depend on pilot (e.g., preamble or DMRS) inserted in the transmitting signal or on the successfully reconstructed data symbols, that later method is regarded as data-pilot technology. Pilot-based channel estimate and data-pilot technology can be used together.

Fourth, multiple large-separated receive antennas can be deployed in a vehicle by making full use of the size of the vehicle body, which can further reduce the correlation of the full duplex self-interference and the target received signal, and therefore further improve the of demodulating performance of the target signals.

In some embodiments, each transmission can contain a certain pilot (e.g., preamble or DMRS) to simplify multi-user detection, that is, by detecting the pilot first, with the MUD receiver of a vehicle can know how many vehicles' or users' signal are received, and these users' channels can be further estimated by pilots, then multi-user detection can be performed. But such a signal processing is done at the expense of (1) a reduction in spectral efficiency because the pilot symbols require a certain amount of overhead, and (2) the problem of collision with the pilots under the V2V direct transmission. Once two vehicles select the same pilot (pilots collide), at least the information of one of the vehicles will not be translated, and sometimes the information of the two vehicles will not be translated, which reduces reliability.

In order to avoid the two problems of pilot collision and pilot overhead in V2V direct communication, the V2V transmission can contain only data symbols, and the multi-user detection can be performed without the pilot, and the multi-user detection can be called data-only multi-user detection or blind multi-user detection. However, due to the lack of pilots, data-only multi-user detection requires the introduction of advanced blind detection techniques, such as blind activity detection and blind equalization. It also requires the data pilot technology, that is, once a user's information is decoded correctly, the reconstructed correct data symbols can be regarded as known pilots for channel estimation.

In order to avoid the two problems of pilot collision and pilot overhead in V2V direct communication, the V2V transmission can contain only data symbols. Further in order to simplify the data-only multi-user detection, the digital modulation method used to generate the modulation symbol in a data-only transmission can be the differential modulation. If each vehicle modulates its FEC coded bits using differential modulation, then the data-only multi-user detection can take advantage of non-coherent demodulation, which avoids the complexity and inaccuracy of channel equalization in multi-user detection. Note that, in a V2V direct communication, Doppler effect introduces a distortion on the modulation symbols which makes the channel equalization more complicated. Thus, differential modulation and non-coherent demodulation can significantly easy the multi-user detection in a V2V direct communication. As the differential modulation and non-coherent demodulation is more sensitive to the inter-user interference and additive white gaussian noise (AWGN), low order differential modulation, such as differential BPSK (DBPSK) or differential $\pi/2$-BPSK ($\pi/2$-DBPSK) or differential QPSK (DQPSK) can be used in V2V direct communication. Note that V2V direct communication using differential modulation can used in both full-duplex as well as conventional half-duplex communication.

In order to further improve reliability, the exemplary placement of transmit and receive antenna, as described in this patent document, can also be combined with the multi-channel scheme. For example, as shown in FIG. 6, a total of six channels can be used, and each vehicle may receive data on all the six channels, but each vehicle may only transmit signals on one or more channels autonomously selected or randomly selected out of the six channels, e.g. one vehicle autonomously selected or randomly selected three out of six channel in the example of FIG. 6.

When transmitting signals on multiple channels autonomously or randomly selected, the spreading sequence is also autonomously or randomly generated or selected if symbol spreading technology is used on each channel, and the pilot sequence used on each channel is also autonomously or randomly generated or selected from a set of pilot signals if pilot sequence is used on each channel. This avoids the collision of the signals of the two vehicles on multiple channels, thereby improving reliability. The spreading code or pilot signal may be randomly generated, or they may be selected from a set of spreading codes or a set of pilot signals, respectively. However, this autonomous or random selection or generation of pilot sequence or spreading code increases the difficulty of multi-user detection. Because even if the receiver has successfully decoded one vehicle's information out of the received signal of one channel, it still does not know the identity of the signals of this vehicle on the other channels, thus cannot reconstruct and eliminate its signals in all its used channels. In order to facilitate the multi-user detection, the FEC coded bits transmitted in each channel can include the information used for the signal generation in all the channels.

Figure 6:
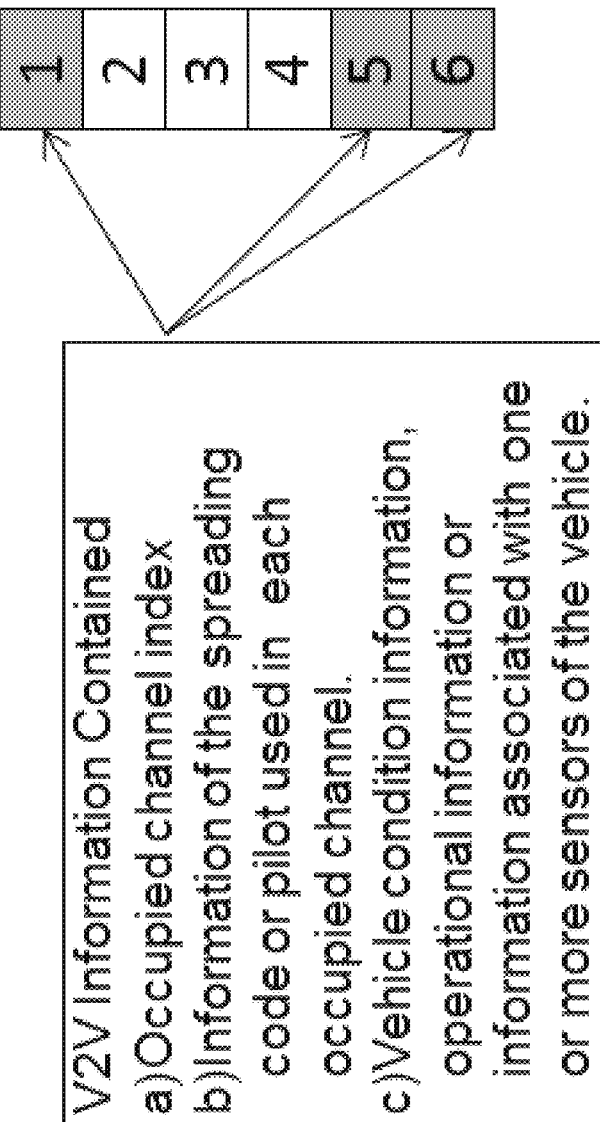
FIG. 6 shows an example multi-channel scheme for transmission or reception of data.

As shown in FIG. 6, a message to be transmitted via a plurality of wireless channels may be generated to include information for multi-user detection. For example, the message may include 1) channel indexes used for transmitting the message; 2) information about spreading code or pilot information used with the message (e.g., a spreading code seed value or a pilot signal seed value); 3) an index of the spreading code selected from a set of spreading codes; and/or 4) an index of the pilot signal (such as preamble or ports of DMRS) selected from a set of pilot signals. On the other hand, if transmissions in all channels contain only the data symbols, the reconstruction do not need to know the information of the pilot. Similarly, if transmissions in all channels do not use symbol spreading or the spreading code is the degenerate one-length spreading code {1}, the reconstruction do not need to know the information of the spreading.

If symbol spreading technology is used, the transmitted information of a vehicle contains information about the spreading sequence autonomously or randomly selected by this vehicle. In this way, after the message information of the vehicle is successfully decoded, the spreading sequence used by the vehicle can be known, and the accurate re-spreading in the reconstruction can be performed, and finally the signal of the vehicle can be easily removed from the received signal, and then the next vehicle can be translated.

If the multi-channel is combined, the transmitted information of a vehicle can include: (a) the information of which channels are occupied by this vehicle, or the index number of the channel for receiving data. For example, a vehicle that uses the multi-channel transmission/reception scheme in FIG. 6 transmits information which includes the occupies three channels [1 5 6]; and/or (b) the spreading sequence used on each channel and/or (c) the pilot sequence used on each channel, so that once the information in one of the channels is translated, it is possible to know how the signal of the car is generated on other channels, and thus can be reconstructed out the signal of this car on all channels, and finally eliminate them, then go to translate the information of the next vehicle.

For example, in the example in FIG. 6, the receiver translates the information on channel 1, knowing that a vehicle also transmitted signals on channel 5 and channel 6. Therefore, the processor associated with the vehicle can reconstruct the signals on channel 5 and channel 6, which needs to know the pilot if pilot sequence is used on each channel, and the spreading sequence if symbol spreading is used on each channel and other information used to reconstruct the signal on channel 5 and channel 6. In order to reduce the exemplary placement of transmit and receive antennas, as described in this patent document, the antenna placements can also be combined with the multi-channel scheme as described in FIG. 6.

Figure 7:
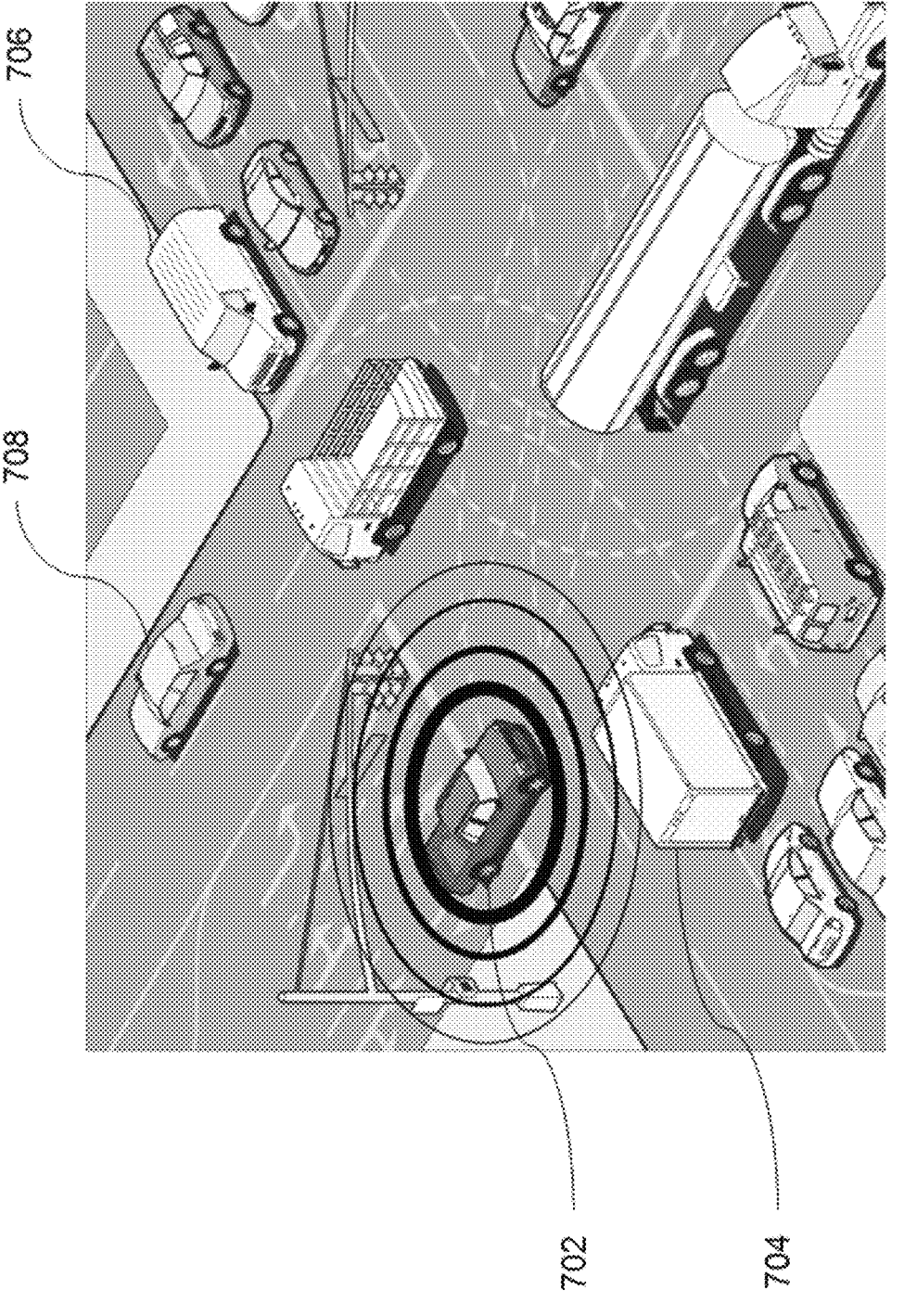
FIG. 7 illustrates a V2V full-duplex communication method based on symbol spreading technology.

FIG. 7 illustrates a V2V full-duplex communication method based on symbol spreading technology. In FIG. 7, each car may spread and then broadcast the data symbols of the vehicle condition information and/or operational information about the driver of the vehicle. The spreading sequence used by a car is autonomously/randomly selected from a low cross-correlation spreading code set. The number of spreading code in the code set can be larger than the length of the spreading code to reduce the possibility of two car selecting the same spreading code. The closer a second adjacent vehicle 702 is to a first vehicle 704 the stronger the signal that can be received by the first vehicle 704. Vehicles 706, 708 that are far away can only receive weak signals or even receive signals.

Furthermore, in order to improve the ability of preventing or avoiding accidents, in some embodiments, the transmit power of the message can be boosted several dBs if the message includes some emergency signal. This can improve the decoding reliability of this emergency signal. For example, the emergency braking the vehicle, emergency accelerating the vehicle, and emergency changing a road lane of the vehicle can be regarded as the emergency signal.

Figure 8:
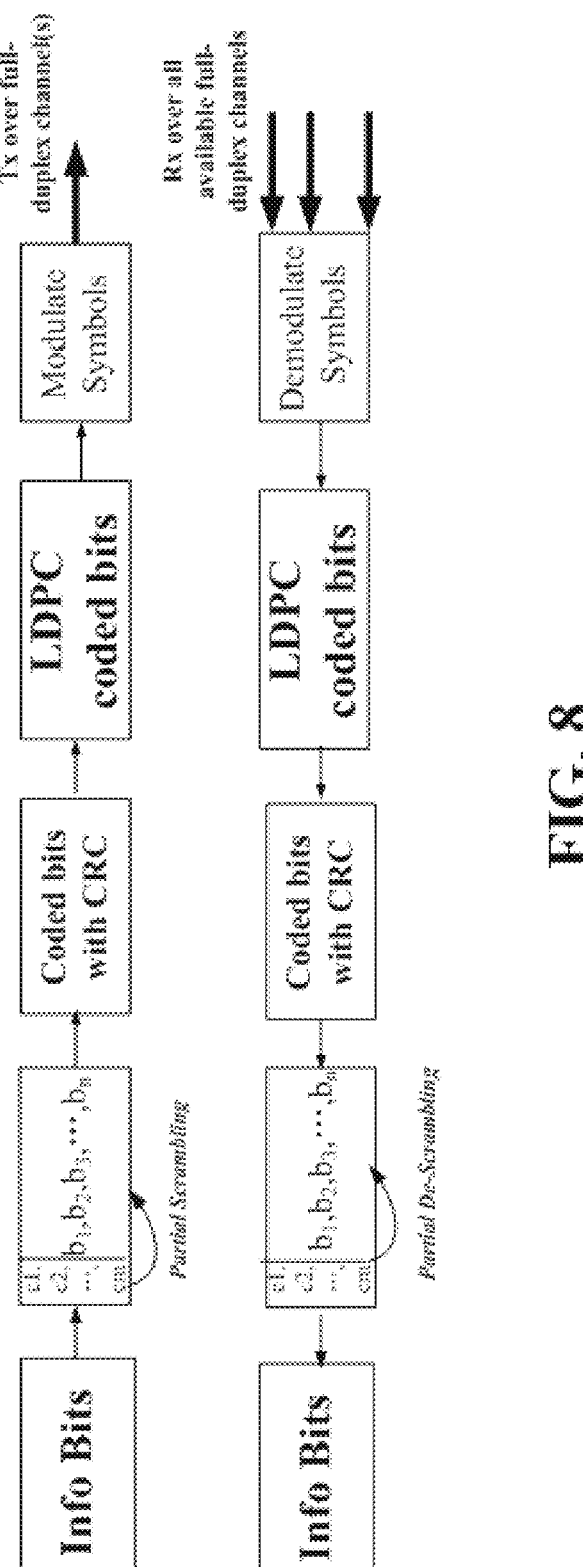
FIG. 8 illustrates a V2V full-duplex communication method with partial scrambling prior to CRC coding.
Figure 9:
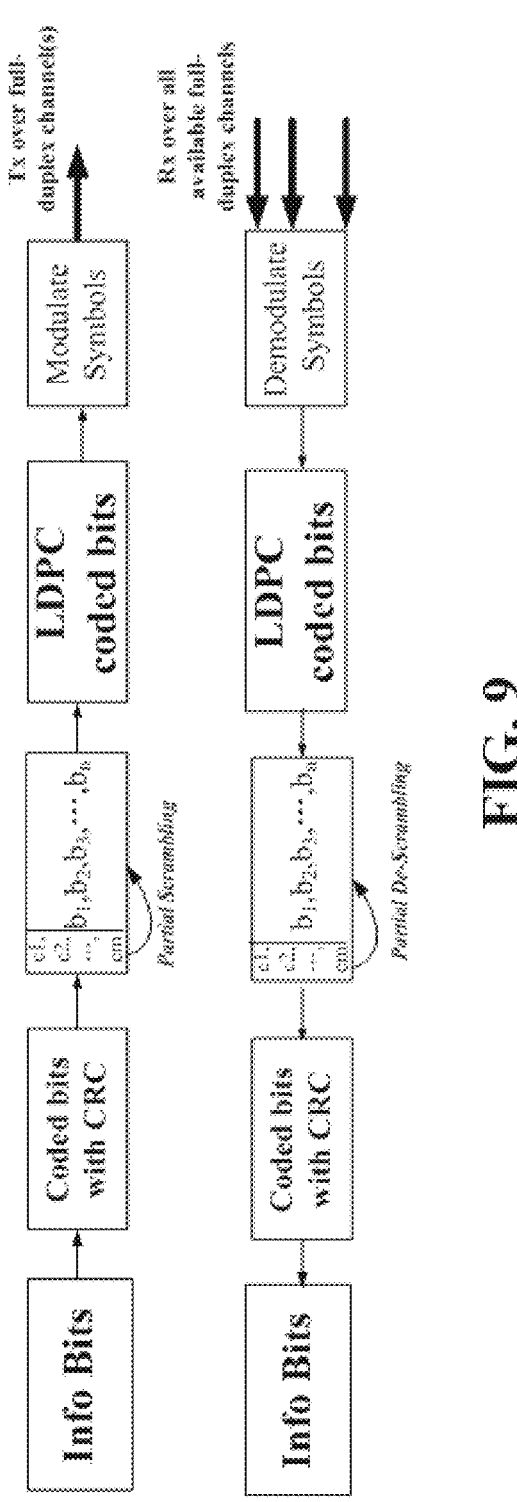
FIG. 9 illustrates a V2V full-duplex communication method with partial scrambling posterior to CRC coding.

FIG. 8 and FIG. 9 show a partial scrambling techniques applied to the transmission side of the V2V full duplex system. The scrambling operations are applied to the bits before and after the CRC coding operations respective. The scrambling sequence is determined from a certain part of bits in the message payload whose information (e.g. the bit index within the information bits) is known to the BS. The scrambling sequence generation methodology, if exist, is also known to the BS. The part of bits generating the scrambling sequence could be the plate information (e.g., license plate information) if the information is included in the payload message. When the payload is successfully decoded, the scrambling sequences could be re-generated based on the decoded bits and the sequence generation methodology. With the scrambling operations, the multi-user interference as well as the self-interference could be randomized. Considering the cases where the transmit bits are similar across difference vehicles, the channel estimation based on the scrambled bits will lead to increased channel estimation accuracy and thereby better interference cancellation and decoding performance for the remaining UEs. The conventional scrambling operations are based on the fact that the scrambler generation bits are identifiers known the both the Tx and Rx side prior to payload transmission. However, in V2V communication, the communications are more likely to happen with no central control unit and the identifiers are not known to both Tx and Rx sides. The partial scrambling technology suits better V2V communications.

Figure 10:
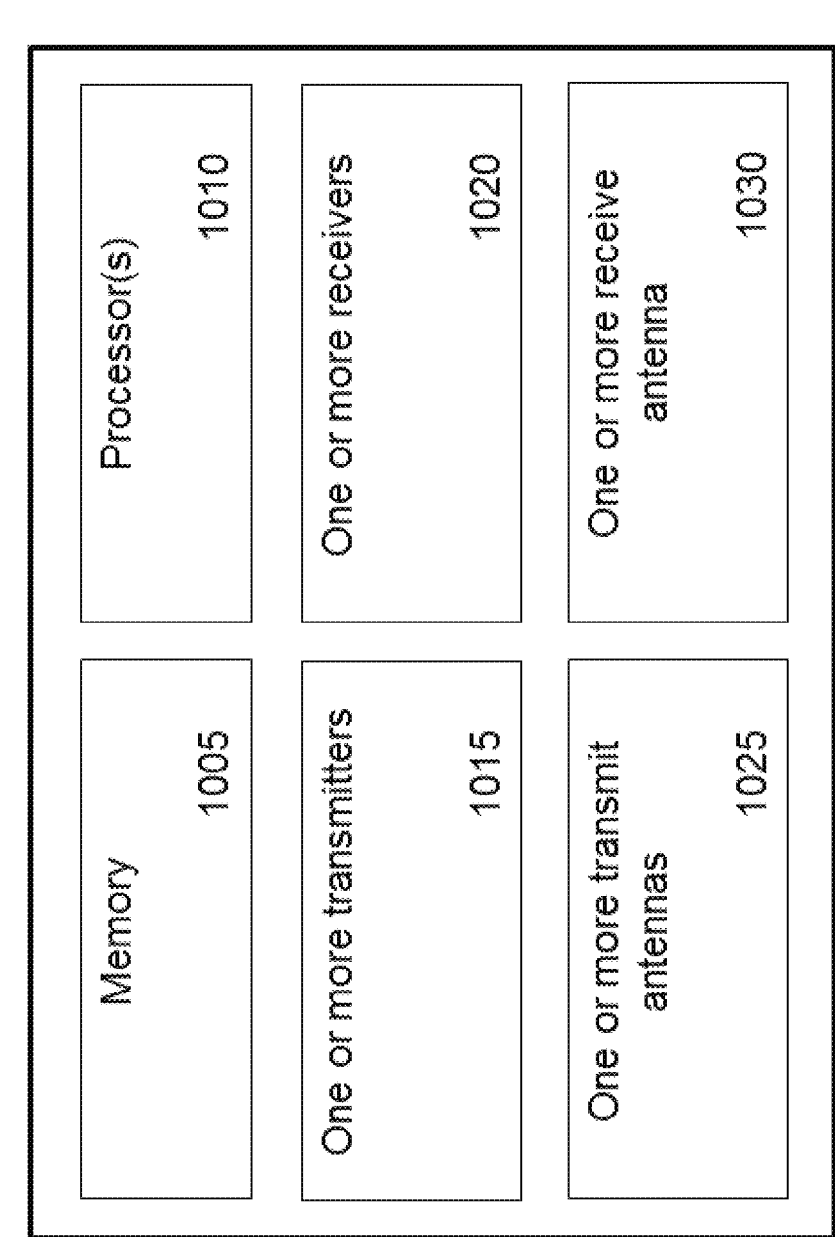
FIG. 10 shows an exemplary block diagram of a hardware platform that may be a part of a vehicle.

FIG. 10 shows an exemplary block diagram of a hardware platform 1000 that may be a part of vehicle. The hardware platform 1000 includes at least one processor 1010 and a memory 1005 having instructions stored thereupon. The instructions upon execution by the processor 1010 configure the hardware platform 1000 to perform the operations described in the various embodiments described in this patent document. For example, the processor 1010 may perform operations related to the transmit signal generator and/or the multi-user detector and self-interference canceller. For example, the processor 1010 can generate a message to be transmitted via the one or more transmitters using the one or more transmit antennas 1025. The one or more transmitters 1015 transmit via the one or more transmit antennas 1025 a message to another vehicle. The message may include vehicle condition information, operational information about a driver of the vehicle, or information associated with one or more sensors of the vehicle. The one or more receivers 1020 receives via the one or more receive antennas 1030 information or data transmitted or sent by another vehicle.

In a first exemplary embodiment, a communication apparatus, comprises a transmit antenna and a receive antenna, where a distance between the transmit antenna and the receive antenna is greater than a pre-determined value, where the transmit antenna and the receive antenna are respectively located on or in a first side and a second side of a vehicle, and where the first side is opposite to the second side. The communication apparatus of the first exemplary embodiment also includes a processor configured to generate one or more messages to be transmitted via the transmit antenna, where the one or more messages includes vehicle condition information, operational information about a driver of the vehicle, or information associated with one or more sensors of the vehicle.

In a second exemplary embodiment, a communication apparatus comprises a transmit antenna and a receive antenna, where a distance between the transmit antenna and the receive antenna is greater than a pre-determined value, and where the transmit antenna and the receive antenna are respectively located on two end points of a diagonal line that extends from one end of a vehicle to another end of the vehicle. The communication apparatus of the second exemplary embodiment also includes a processor configured to generate one or more messages to be transmitted via the transmit antenna, where the one or more messages includes vehicle condition information, operational information about a driver of the vehicle, or information associated with one or more sensors of the vehicle.

In some implementations of the first and second exemplary embodiment, the transmit antenna and the receive antenna are located on or in a middle region of the first side and the second side, respectively.

In some implementations of the first and second exemplary embodiment, the transmit antenna and the receive antenna are located respectively in a first region and a second region of the vehicle, and the first region is located above the second region.

In a third exemplary embodiment, a communication apparatus comprises a transmit antenna and a plurality of receive antennas, where a distance between the transmit antenna and each receive antenna is greater than a pre-determined value. The communication apparatus of the third exemplary embodiment also includes a processor configured to generate one or more messages to be transmitted via the transmit antenna, where the one or more messages includes vehicle condition information, operational information about a driver of the vehicle, or information associated with one or more sensors of the vehicle.

In some implementations of the third exemplary embodiment, a first receive antenna and a second receive antenna are respectively located on two end points of a diagonal line that extends from one end of the vehicle to another end of the vehicle. In some implementations of the third exemplary embodiment, a first receive antenna is located on or in a middle region of a first side of the vehicle, and the second receive antenna is located on or in a middle region of a second side of the vehicle, where the first side is opposite to the second side. In some implementations of the third exemplary embodiment, the first receive antenna and the second receive antenna are located respectively in a first region and a second region of the vehicle, and the first region is located above the second region.

In some implementations of the third exemplary embodiment, four receive antennas are located on or in four sides of the vehicle or four corners of the vehicle. In some implementations of the third exemplary embodiment, six or eight receive antennas are evenly distributed around the vehicle. In some implementations of the third exemplary embodiment, the transmit antenna is located on or in a central region of a top surface of a vehicle.

In a fourth exemplary embodiment, a communication apparatus comprises two transmit antennas and a plurality of receive antennas, where a distance between each transmit antenna and each receive antenna is greater than a pre-determined value, and where the two transmit antennas are located on or in central region of a top surface of a vehicle. The communication apparatus of the fourth exemplary embodiment also includes a processor configured to generate one or more messages to be transmitted via one of the two transmit antennas, where the one or more messages includes vehicle condition information, operational information about a driver of the vehicle, or information associated with one or more sensors of the vehicle.

In some implementations of the fourth exemplary embodiment, two receive antennas are located on or in one side of the vehicle. In some implementations of the fourth exemplary embodiment, four receive antennas are located on or in four sides of a vehicle or four corners of a vehicle. In some implementations of the fourth exemplary embodiment, six or eight receive antennas are evenly distributed around a vehicle.

In some implementations of the fourth exemplary embodiment, two receive antennas are located on or in a central region of a top surface of the vehicle. In some implementations of the fourth exemplary embodiment, four receive antennas are located on or in a central region of a top surface of the vehicle In some embodiments, the communication apparatus further includes one or more attenuators located proximate to one or more receive antenna, where an attenuator is located between each receive antenna and at least one transmit antenna, and where the attenuator is structured to attenuate wireless signals transmitted by the at least one transmit antenna.

In some embodiments, the processor is configured to modulate the one or more messages by using binary phase shift keying (BPSK) modulation, $\pi/2$-BPSK modulation, or quadrature phase shift keying (QPSK) modulation, where the one or more messages includes the generated digital modulation symbols. In some embodiments, the processor is configured to modulate the one or more messages by using differential binary phase shift keying (DBPSK) modulation, differential $\pi/2$-BPSK ($\pi/2$-DBPSK) modulation, or differential quadrature phase shift keying (DQPSK) modulation, where the one or more messages includes the generated digital modulation symbols.

In some embodiments, the processor is configured to generate one or more spreading codes to spread symbols of the one or more messages, where the one or more spreading codes are generated according to information of spreading code included in the messages to be transmitted, or the processor is configured to select one or more spreading codes to spread symbols of the one or more messages, where the one or more spreading codes are selected from a spreading code set according to information of spreading code included in the messages to be transmitted.

In some embodiments, the processor is configured to generate pilot signal according to information of a pilot signal included in the messages to be transmitted, or the processor is configured to select pilot signal to spread symbols of the one or more messages, where the pilot signal is selected from a pilot signal set according to the information of the pilot signal included in the messages to be transmitted, where the pilot signal is transmitted with the message In some embodiments, one or more receive antennas are configured to receive signals from one or more other vehicles. In some embodiments, the vehicle condition information includes a vehicle identification, a license plate number, a current location of the vehicle, a speed of the vehicle, a size of the vehicle, or a color of the vehicle. In some embodiments, the operational information about the driver of the vehicle includes information associated with an ongoing operation performed by the driver or information associated with an operation that is to be performed by the driver. In some embodiments, the ongoing operation includes braking the vehicle, starting the vehicle, accelerating the vehicle, changing a road lane of the vehicle, or steering the vehicle. In some embodiments, the operation that is to be performed includes preparing for braking the vehicle, preparing to start the vehicle, preparing to accelerate the vehicle, preparing to change a road lane of the vehicle, preparing to steer the vehicle.

In some embodiments, the one or more messages is transmitted via at least one transmit antenna on a plurality of transmission channels. In some embodiments, the plurality of transmission channels is selected from a set of transmission channels according to information of the plurality of transmission channels included in the messages to be transmitted. In some embodiments, the one or more messages includes a channel index information of the plurality of transmission channels used to transmit the one or more messages.

In some embodiments, the processor is configured to generate one or more spreading codes to spread symbols of the one or more messages according to information of spreading codes included in the messages to be transmitted, or the processor is configured to select one or more spreading codes from a spreading code set to spread symbols of the one or more messages according to the information of spreading codes included in the messages to be transmitted.

In some embodiments, each of the one or more messages transmitted using the plurality of transmission channels includes seed values of the spreading codes or the initial states of the spreading codes or the indexes of the spreading codes associated with the spreading code set. In some embodiments, each of the one or more messages transmitted using the plurality of wireless channels includes a pilot signal, each pilot signal is generated according to the information of the pilot signal included in the messages to be transmitted, or where each pilot signal is selected from a set of pilot signals according to the information of the pilot signal included in the messages to be transmitted. In some embodiments, each of the one or more messages includes a seed value of the pilot signal, or each of the one or more messages includes an initial state of the pilot signal, each of the one or more messages includes an index of the pilot signal associated with the set of pilot signals.

In some embodiments, the transmit power of the message is boosted by or up to a pre-determined value if the message includes some pre-determined emergency signal. In some embodiments, the pre-determined emergency signal includes emergency braking the vehicle, emergency accelerating the vehicle, or emergency changing a road lane of the vehicle. In some embodiments, the driver includes an autonomous driving system of the vehicle. In some embodiments, a method of wireless communication, comprises performing a wireless transmission or a wireless reception using the communication apparatus recited in any one or more of the embodiments above. In some embodiments, at least one transmit antenna and one or more receive antennas are configured to perform full-duplex communication.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A communication apparatus in a vehicle, comprising:

at least one transmitter antenna configured to transmit signals without performing receiving functions for a full-duplex communication; and at least one receiver antenna configured to receive signals without performing transmitting functions for the full-duplex communication, wherein any pair of transmitter antenna and receiver antenna among the at least one transmitter antenna and at least one receiver antenna are disposed on the vehicle such that they are placed as far apart as possible from one another along their connecting line with a distance being greater than a pre-determined value representing a width or length of the vehicle; and at least one processor configured to:

generate one or more messages to be transmitted via the at least one transmitter antenna, wherein the one or more messages include vehicle condition information, operational information about a driver of the vehicle, or information associated with one or more sensors of the vehicle;

generate a scrambling sequence based on at least certain coded bits from a payload part of the one or more message, the certain coded bits including at least a plate information of the vehicle; and scramble a part of the one or more messages with the scrambling sequence to achieve a partial scrambling, wherein transmit power of a message of the one or more messages are boosted to a pre-determined value if the message of the one or more messages includes a pre-determined emergency signal indicating emergency breaking, emergency acceleration, or emergency lane changing of the vehicle.

2. The communication apparatus of claim 1, wherein:

the at least one transmitter antenna and the at least one receiver antenna are respectively located on two end points of a diagonal line that extends from one end of the vehicle to another end of the vehicle; or the at least one transmitter antenna and the at least one receiver antenna are respectively located on or in a first side and a second side of the vehicle, the first side being opposite to the second side.

3. The communication apparatus of claim 2, wherein the at least one transmitter antenna and the at least one receiver antenna are located on or in a middle region of the first side and the second side, respectively.

4. The communication apparatus of claim 2, wherein the at least one transmitter antenna and the at least one receiver antenna are located respectively in a first region and a second region of the vehicle, and wherein the first region is located above the second region.

5. The communication apparatus of claim 1, wherein:

the communication apparatus comprises a plurality of receiver antennas, wherein the distance between the at least one transmitter antenna and each receiver antenna is greater than the pre-determined value.

6. The communication apparatus of claim 5, wherein a first receiver antenna and a second receiver antenna are respectively located on two end points of a diagonal line that extends from one end of the vehicle to another end of the vehicle, wherein the first receiver antenna and the second receiver antenna are located respectively in a first region and a second region of the vehicle, and wherein the first region is located above the second region.

7. The communication apparatus of claim 5, wherein a first receiver antenna is located on or in a middle region of a first side of the vehicle, wherein a second receiver antenna is located on or in a middle region of a second side of the vehicle, wherein the first side is opposite to the second side, and wherein the first receiver antenna and the second receiver antenna are located respectively in a first region and a second region of the vehicle, and wherein the first region is located above the second region.

8. The communication apparatus of claim 5, wherein four, six, or eight receiver antennas are evenly distributed around the vehicle.

9. The communication apparatus of claim 5, wherein the at least one transmitter antenna is located on or in a central region of a top surface of the vehicle.

10. The communication apparatus of claim 1, comprising:

two transmitter antennas and a plurality of receiver antennas, wherein the distance between each transmitter antenna and each receiver antenna is greater than the pre-determined value, wherein the two transmitter antennas are located on or in central region of a top surface of the vehicle.

11. The communication apparatus of claim 1, further comprising:

one or more wireless radio frequency attenuators located proximate to the at least one receiver antenna, wherein a wireless radio frequency attenuator is located between one receiver antenna and one transmitter antenna, and wherein the wireless radio frequency attenuator is structured to attenuate wireless signals transmitted by the at least one transmitter antenna.

12. The communication apparatus of claim 1, wherein the at least one processor is further configured to modulate the one or more messages by using binary phase shift keying (BPSK) modulation, $\pi/2$-BPSK modulation, quadrature phase shift keying (QPSK) modulation, differential binary phase shift keying (DBPSK) modulation, differential $\pi/2$-BPSK ($\pi/2$-DBPSK) modulation, or differential quadrature phase shift keying (DQPSK) modulation to generate digital modulation symbols, and to include the digital modulation symbols in the one or more messages.

13. The communication apparatus of claim 1, wherein the at least one processor is further configured to generate one or more spreading codes to spread symbols of the one or more messages, wherein the one or more spreading codes are generated according to information of spreading code included in information bits in the one or more messages to be transmitted, or wherein the at least one processor is further configured to select one or more spreading codes to spread symbols of the one or more messages, wherein the one or more spreading codes are selected from a spreading code set according to information of spreading code included in information bits in the messages to be transmitted.

14. The communication apparatus of claim 1, wherein the at least one processor is further configured to generate a pilot signal according to pilot signal information included in the one or more messages to be transmitted, or wherein the at least one processor is configured to select a pilot signal to spread symbols of the one or more messages, wherein the pilot signal is selected from a pilot signal set according to the information of the pilot signal included in a messages to be transmitted, and wherein the pilot signal is transmitted with the message.

15. The communication apparatus of claim 1, wherein:

the vehicle condition information includes a vehicle identification, a license plate number, a current location of the vehicle, a speed of the vehicle, a size of the vehicle, or a color of the vehicle;

the operational information about the driver of the vehicle includes information associated with an ongoing operation performed by the driver or information associated with an operation that is to be performed by the driver;

the ongoing operation includes braking the vehicle, starting the vehicle, accelerating the vehicle, changing a road lane of the vehicle, or steering the vehicle; and the operation that is to be performed includes preparing for braking the vehicle, preparing to start the vehicle, preparing to accelerate the vehicle, preparing to change a road lane of the vehicle, preparing to steer the vehicle.

16. The communication apparatus of claim 1, wherein:

the one or more messages are transmitted via the at least one transmitter antenna on a plurality of transmission channels;

the plurality of transmission channels is selected from a set of transmission channels according to information of the plurality of transmission channels included in the messages to be transmitted; and the one or more messages include a channel index information of the plurality of transmission channels used to transmit the one or more messages.

17. The communication apparatus of claim 1, wherein the one or more messages are transmitted via at least one transmitter antenna on a plurality of transmission channels;

wherein the at least one processor is further configured to: generate one or more spreading codes to spread symbols of the one or more messages according to information of spreading codes included in the one or more messages to be transmitted, or to select one or more spreading codes from a spreading code set to spread symbols of the one or more messages according to the information of spreading codes included in the messages to be transmitted; and wherein each of the one or more messages transmitted using the plurality of transmission channels includes seed values of the spreading codes or initial states of the spreading codes or indexes of the spreading codes associated with the spreading code set.

18. The communication apparatus of claim 1, the one or more messages are transmitted via at least one transmitter antenna on a plurality of wireless channels;

wherein each of the one or more messages transmitted using the plurality of wireless channels includes a pilot signal, wherein each pilot signal is generated according to pilot signal information included in the messages to be transmitted, or wherein each pilot signal is selected from a set of pilot signals according to information of the pilot signal included in the messages to be transmitted;

wherein each of the one or more messages includes at least one of a seed value of the pilot signal, an initial state of the pilot signal, or an index of the pilot signal.

19. A method of wireless communication, comprising:

performing full-duplex communication using the communication apparatus of claim 1.

\* \* \* \* \*